(12) United States Patent
Watanabe

(10) Patent No.: US 6,819,499 B2
(45) Date of Patent: Nov. 16, 2004

(54) ZOOM LENS SYSTEM, AND IMAGE PICKUP SYSTEM USING THE SAME

(75) Inventor: Masahito Watanabe, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/611,970

(22) Filed: Jul. 3, 2003

(65) Prior Publication Data

US 2004/0095654 A1 May 20, 2004

Related U.S. Application Data

(62) Division of application No. 09/709,551, filed on Nov. 13, 2000, now Pat. No. 6,614,599.

(30) Foreign Application Priority Data

Nov. 12, 1999 (JP) .......................................... 11-322452

(51) Int. Cl.⁷ .............................................. G02B 15/14
(52) U.S. Cl. ....................................... 359/689; 359/680
(58) Field of Search .......................... 359/689, 680–682, 359/683, 676

(56) References Cited

U.S. PATENT DOCUMENTS

| | | | |
|---|---|---|---|
| 6,308,011 B1 * | 10/2001 | Wachi et al. | .................. 396/72 |
| 6,349,002 B1 | 2/2002 | Shibayama et al. | |
| 2003/0189762 A1 * | 10/2003 | Mihara et al. | ............... 359/680 |
| 2004/0051963 A1 * | 3/2004 | Ori | ............................ 359/689 |

FOREIGN PATENT DOCUMENTS

| | | |
|---|---|---|
| JP | 7-261083 | 10/1995 |
| JP | 09-21950 | 1/1997 |
| JP | 10-39214 | 2/1998 |
| JP | 11-23967 | 1/1999 |
| JP | 11-52246 | 2/1999 |
| JP | 11-174322 | 7/1999 |

* cited by examiner

Primary Examiner—Scott J. Sugarman
Assistant Examiner—M. Hasan
(74) Attorney, Agent, or Firm—Pillsbury Winthrop LLP

(57) ABSTRACT

The invention provides a zoom lens system which has a zoom ratio of about 3, a wide field angle on the wide-angle end and a small F-number and enables satisfactory image-formation capability to be obtained. The zoom lens system comprises a first lens group G1 having negative power, an aperture stop, a second lens group G2 having positive power and a third lens group G3 having positive power. For zooming, the first and second lens groups G1 and G2 move on the optical axis with a varying spacing between adjacent lens groups while the third lens group G3 remains fixed. During zooming, the stop moves in unison with the second lens group. The first lens group consists of a negative, a negative and a positive lens and the third lens group consists of one lens. The first lens group further comprises a lens having an aspherical surface satisfying condition (1), and the third lens group further comprises a lens having an aspherical surface satisfying condition (2).

9 Claims, 14 Drawing Sheets

ZOOM LENS SYSTEM, AND IMAGE PICKUP SYSTEM USING THE SAME

CROSS REFERENCE TO RELATED APPLICATIONS

This Application is a Divisional Application of U.S. application No. 09/709,551, filed Nov. 13, 2000, now U.S. Pat. No. 6,614,599 allowed, the entire original contents of which are incorporated herein by reference.

This application claims benefit of Japanese Application(s) No. Hei 11-322452 filed in Japan on Nov. 12, 1999, the contents of which are incorporated by this reference.

BACKGROUND OF THE INVENTION

The present invention relates generally to a zoom lens system and an image pickup system using the same, and more particularly to a zoom lens system suitable for video cameras or electronic still cameras using electronic image pickup devices such as CCDs or CMOSs and an image pickup system using the same.

Among zoom lens systems so far known to be suitable for use ON cameras using electronic image pickup devices, there is an optical system which comprises, in order from an object side thereof, a first lens group having negative power, a second lens group having positive power and a third lens group having positive power together with filters having a low-pass filter function, etc., and image pickup devices, and in which zooming is carried out by moving the first and second lens groups on the optical axis while varying the spacing between adjacent lens groups.

With an increase in the number of pixels in recently developed electronic image pickup devices such as CCDs or CMOSs, on the other hand, there are growing demands for a zoom lens system having ever-higher image-formation capability, a zoom lens system having an ever-higher zoom ratio and a zoom lens system having an ever-wider field angle on the wide-angle side in particular.

Size reductions of image pickup devices and a more increased number of pixels cause a decrease in the light sensing areas of individual pixels, resulting in strong demands for a lens system having a smaller F-number than ever before.

For a zoom lens system having a field angle (2ω) of the order of 60° to 67° on the wide-angle side, a zoom ratio of the order of 3 and an F-number of the order of 2, some proposals have already been made, as disclosed in JP-A's 11-23967 and 11-52246. However, this is still less than satisfactory in terms of the magnitude of field angle and distortion at the wide-angle end. A zoom lens system having a field angle (2ω) exceeding 70° on the wide-angle side, too, is put forward, as disclosed in JP-A's 11-174322 and 10-39214. However, this leaves much to be desired in terms of F-number. Zoom lens systems disclosed in JP-A's 10-39214 and 9-21950 are still unsatisfactory in terms of distortion, etc.

Generally, correction of off-axis aberrations and especially distortion and chromatic aberrations of magnification becomes difficult with an increasing field angle, and correction of spherical aberrations and coma becomes difficult with a decreasing F-number.

SUMMARY OF THE INVENTION

In view of such states of the prior art as explained above, one object of the present invention is to provide a zoom lens system having a zoom ratio of about 3, a wide field angle on its wide-angle side and a small F-number as well as a lens layout enabling satisfactory image-formation capability to be obtained. Another object of the invention is to provide a lens layout with emphasis placed on fabrication capability.

According to the first aspect of the present invention, these objects are achievable by the provision of a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said first lens group comprises, in order from an object side thereof, a negative lens component, a negative lens component and a positive lens component, said third lens group consists of one lens element, said first lens group further comprises a lens element having an aspherical surface that satisfies the following condition (1), and said third lens group further comprises lens element having an aspherical surface that satisfies the following condition (2):

$$0 < (1/r_{a1} - 1/r_{m1})h_1/(n_{a1} - n_{a1}') < 1 \tag{1}$$

$$-1 < (1/r_{a3} - 1/r_{m3})h_3/(n_{a3} - n_{a3}') < 0 \tag{2}$$

where $r_{a1}$ is the paraxial radius of curvature of an aspherical surface I located in said first lens group, $r_{m1}$ is a distance from a point of intersection of an optical axis with said aspherical surface I located in said first lens group to a point on the optical axis where a normal to an arbitrary point (1) between the maximum diameter of an axial light beam on said aspherical surface I and an effective diameter including an off-axis light beam on said aspherical surface I is closest to the optical axis, $n_{a1}$ is the refractive index of said aspherical surface I on an object side thereof, $n_{a1}'$ is the refractive index of said aspherical surface I on an image side thereof, $h_1$ is the height of said point (1) from the optical axis, $r_{a3}$ is the paraxial radius of curvature of an aspherical surface III located in said third lens group, $r_{m3}$ is a distance from a point of intersection of the optical axis with said aspherical surface III located in said third lens group to a point on the optical axis where a normal to an arbitrary point (3) between the maximum diameter of an axial light beam on said aspherical surface III and an effective diameter including an off-axis light beam on said aspherical surface III is closest to the optical axis, $n_{a3}$ is the refractive index of said aspherical surface III on an object side thereof, $n_{a3}'$ is the refractive index of said aspherical surface III on an image side thereof, and $h_3$ is the height of said point (3) from the optical axis.

The action and effect of the first zoom lens system according to the present invention are now explained.

By moving the first lens group having negative power and the second lens group having positive power for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. By the "shadings" are here intended color tone changes (color shading) and rim light quantity changes (shading). For instance, these shadings occur upon oblique incidence of light rays on an image pickup device such as a CCD. This oblique incidence of light occurs depending on the structure of the device, for instance, when color filters and light sensors are positioned in the back of the device, e.g., at a light-shielding portion for a charge transfer path or microlenses are located on the object side of the light-shielding portion for the charge transfer path. To avert this shading problem, it is preferable to locate the exit pupil at a farther position.

To reduce the overall length of the zoom lens system, it is preferable to construct the third lens group of one lens, because the axial length of the third lens group can be reduced.

The third lens group has a little influence on deterioration of aberrations with respect to axial beams. At the third lens group, however, off-axis light beams and especially astigmatism are likely to occur. By increasing the number of lenses to form the third lens group, image-formation capability may be enhanced depending on the performance, etc. of the image pickup device. In the present invention, however, the third lens group is composed of one positive lens by the introduction of the aspherical surface that satisfies condition (2). By satisfying condition (2), the difference between the center thickness and the peripheral thickness of the lens can be narrowed, thereby reducing the amount of astigmatism produced when the zoom lens system is used on an image pickup device required to have such high image-formation capability as represented by an increased number of pixels. When the upper limit of 0 to condition (2) is exceeded, the aspherical surface loses its own effect, and so fails to reduce astigmatism. Falling below the lower limit of −1 is not preferable, because off-axis beams strike on an image pickup plane from a largely oblique direction with respect to the vertical direction under an adverse influence on a substantial exit pupil position with respect to off-axis beams.

By constructing the first lens group of a negative lens, a negative lens and a positive lens in such a way that the negative lens components are located on the object side, it is possible to make the outer diameter of the first lens group small. By use of two negative lenses, the amounts of various aberrations produced can be reduced. Especially in the case of a wide-angle yet compact lens layout, an excessive load is applied on the first lens group, resulting in the occurrence of distortion and coma leading to deterioration of performance. By the introduction of the aspherical surface conforming to condition (1) in the first lens group, it is possible to maintain performance. By satisfying condition (1), aberrations produced at the third lens group with respect to off-axis light beams are placed in a well-balanced state. Falling below the lower limit of 0 to condition (1) is not preferable because the aspherical surface loses its own effect. Exceeding the upper limit of 1 is not preferable because correction of aberrations throughout the zoom lens system goes out of balance.

According to the second aspect of the present invention, there is provided a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said third lens group consists of one lens element, and said first lens group comprises a lens element obtained by coating a thin resin on a concave surface of a spherical lens element satisfying the following condition (3), thereby forming an spherical surface thereon:

$$-0.1 < (1/r_{a1}' - 1/r_{m1})h_1/(n_{a1} - n_{a1}') < 1 \quad (3)$$

where $r_{a1}'$ is the paraxial radius of curvature of the concave surface coated thereon with the resin to form an aspherical surface I located in said first lens group, $r_{m1}$ is a distance from a point of intersection of an optical axis with said aspherical surface I located in said first lens group to a point on the optical axis where a normal to an arbitrary point (1) between the maximum diameter of an axial light beam on said aspherical surface I and an effective diameter including an off-axis light beam on said aspherical surface I is closest to the optical axis, $n_{a1}$ is the refractive index of said aspherical surface I on an object side thereof, $n_{a1}'$ is the refractive index of said aspherical surface I on an image side thereof, and $h_1$ is the height of said point (1) from the optical axis.

The action and effect of the second zoom lens system according to the present invention are now explained.

By moving the first lens group having negative power and the second lens group having positive power for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. To reduce the overall length of the zoom lens system, it is preferable to construct the third lens group of one lens, because the axial length of the third lens group can be reduced.

Especially in the case of a wide-angle yet compact lens layout, an excessive load is applied on the first lens group, resulting in the occurrence of distortion and coma leading to deterioration of performance. By the introduction of the aspherical surface conforming to condition (1) in the first lens group, it is possible to maintain performance. In this case, it is preferable to use a lens fabricated by coating a thin resin on the concave surface of a spherical lens to form an aspherical surface thereon, because the aspherical surface can be easily formed. In particular, it is preferable to satisfy condition (3). By satisfying condition (3), it is thus possible to form an aspherical surface for the purpose of obtaining satisfactory image-formation capability with no significant change in the thickness of the resin coating. Significant changes in the resin coating are not preferable, because the performance of the resin coating is likely to change due to temperature and humidity changes and any easy solidification of the resin is not achieved during fabrication. When the lower limit of −0.1 to condition (3) is not reached, the necessary aspherical performance is not obtained. Exceeding the upper limit of 1 is not preferable, because the thickness of the resin coating changes largely. It is here noted that the paraxial radius of curvature of the concave surface coated with the resin is not always required to be equal to that of the aspherical surface, although this is mainly determined in view of fabrication capability, etc.

According to the third aspect of the present invention, there is provided a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said first lens group consists of, in order from an object side thereof, a negative lens component, air, a negative lens component, air and a positive lens component, said third lens group consists of one lens element, and said second lens group consists of, in order from an object side thereof, a positive lens component, a cemented lens component consisting of a positive element and a negative element and a positive lens component, and the following condition (4) is satisfied:

$$0.4 < f_3/f_t < 2.5 \quad (4)$$

where $f_3$ is the focal length of said third lens group and $f_t$ is the focal length of said zoom lens system at a telephoto end thereof.

The action and effect of the third zoom lens system according to the present invention are now explained.

By moving the first lens group having negative power and the second lens group having positive power for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. To reduce the overall length of the zoom lens system, it is preferable to construct the third lens group of one lens, because the axial length of the third lens group can be reduced.

By constructing the first lens group of a negative lens, a negative lens and a positive lens in such a way that the negative lens components are located on the object side, it is possible to make the outer diameter of the first lens group small. By use of two negative lenses, the amounts of various aberrations produced can be reduced. Distortion in particular can be reduced by providing an air spacing between adjacent lenses in the first lens group, rather than cementing them together, thereby imparting an independent radius of curvature to each lens.

When the second lens group is comprised of, in order from an object side thereof, a positive lens, a +− cemented lens and a positive lens, it is possible to suppress the occurrence of spherical aberrations and off-axis coma with two positive lenses located in the vicinity of the aperture stop. The second lens group cooperates at its image-side positive lens with the third lens group to gain control of off-axis aberrations while the exit pupil position is spaced away from the image-formation plane, and makes it possible to control chromatic aberrations with the negative lens located between the second positive lens as counted from the object side and the positive lens on the image side. This negative lens, because of being only one negative lens between the aperture stop and the image side, takes some considerable part in correction of aberrations, and so is severely affected by fabrication errors. By cementing this negative lens to the second positive lens, it is possible to achieve an optical system resistant to fabrication errors. It is also possible to prevent higher-order aberrations from occurring between the second lens and the negative lens, thereby achieving more efficient prevention of chromatic aberrations.

By conforming to condition (4), it is possible to achieve satisfactory image-formation capability and take a good exit pupil position while the third lens group is made up of a reduced number of lenses. When the upper limit of 2.5 is exceeded, it is difficult to locate the exit pupil at a farther position while the total length of the zoom lens system is kept short. When the lower limit of 0.4 is not reached, aberrations produced at the third lens group become too large to maintain performance.

According to the fourth aspect of the present invention, there is provided a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said first lens group consists of, in order from an object side thereof, a negative lens component, air, a negative lens component, air and a positive lens component, said third lens group consists of one lens element, said second lens group consists of, in order from an object side thereof, a positive lens component, a cemented lens component consisting of a positive element and a negative element and a positive lens component, and the following condition (5) is satisfied:

$$1.2 < f_{1-N}/f_{2-N} < 2.7 \quad (5)$$

where $f_{1-N}$ is the focal length of the negative lens located nearest to the object side in said first lens group, and $f_{2-N}$ is the focal length of the second negative lens in said first lens group, as counted from the object side.

The action and effect of the fourth zoom lens system according to the present invention are now explained.

By moving the first lens group having negative power and the second lens group having positive power for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. To reduce the overall length of the zoom lens system, it is preferable to construct the third lens group of one lens, because the axial length of the third lens group can be reduced.

By constructing the first lens group of a negative lens, a negative lens and a positive lens in such a way that the negative lens components are located on the object side, it is possible to make the outer diameter of the first lens group small. By use of two negative lenses, the amounts of various aberrations produced can be reduced. Distortion in particular can be reduced by providing an air spacing between adjacent lenses in the first lens group, rather than cementing them together, thereby imparting an independent radius of curvature to each lens.

When the second lens group is comprised of, in order from an object side thereof, a positive lens, a +− cemented lens and a positive lens, it is possible to suppress the occurrence of spherical aberrations and off-axis coma with two positive lenses located in the vicinity of the aperture stop. The second lens group cooperates at its image-side positive lens with the third lens group to control off-axis aberrations while the exit pupil position is spaced away from the image-formation plane, and makes it possible to control chromatic aberrations with the negative lens located between the second positive lens as counted from the object side and the positive lens on the image side. This negative lens, because of being only one negative lens between the aperture stop and the image side, takes some considerable part in correction of aberrations, and so is severely affected by fabrication errors. By cementing this negative lens to the second positive lens, it is possible to achieve an optical system resistant to fabrication errors. It is also possible to prevent higher-order aberrations from occurring between the second lens and the negative lens, thereby achieving more efficient prevention of chromatic aberrations.

Condition (5) gives a definition of the power ratio between the first lens and the second lens in the first lens group. An off-axis beam on the wide-angle side in particular has not only a large angle of incidence with respect to the optical axis but also a large angle of incidence with respect to the first surface. The first and second lenses have one function of making the angle of this light beam with respect to the optical axis gentle, using four surfaces. By satisfying condition (5), it is possible to make more efficient use of this function. When the lower limit of 1.2 to condition (5) is not reached, it is difficult to make correction for coma and astigmatism produced at the concave lens located nearest to the object side. When the upper limit of 2.7 is exceeded, aberrations produced at the second concave lens from the object side become too large.

According to the fifth aspect of the present invention, there is provided a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said first lens group consists of, in order from an object side thereof, a negative lens component, air, a negative lens component, air and a positive lens component, said third lens group consists of one lens element, said second lens group consists of, in order from an object side thereof, a positive lens component, a cemented lens component consisting of a positive element and a negative element and a positive lens component, and the following condition (6) is satisfied:

$$2 < f_3/IH < 12 \quad (6)$$

where $f_3$ is the focal length of said third lens group, and IH represents an image height.

The action and effect of the fifth zoom lens system according to the present invention are now explained.

By moving the first lens group having negative power and the second lens group having positive power for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. To reduce the overall length of the zoom lens system, it is preferable to construct the third lens group of one lens, because the axial length of the third lens group can be reduced.

By constructing the first lens group of a negative lens, a negative lens and a positive lens in such a way that the negative lens components are located on the object side, it is possible to make the outer diameter of the first lens group small. By use of two separate negative lenses, the amounts of various aberrations produced can be reduced. Distortion in particular can be reduced by providing an air spacing between adjacent lenses in the first lens group, rather than cementing them together, thereby imparting an independent radius of curvature to each lens.

When the second lens group is comprised of, in order from an object side thereof, a positive lens, a +− cemented lens and a positive lens, it is possible to suppress the occurrence of spherical aberrations and off-axis coma with two positive lenses located in the vicinity of the aperture stop. The second lens group cooperates at its image-side positive lens with the third lens group to control off-axis aberrations while the exit pupil position is located farther off the image-formation plane, and makes it possible to control chromatic aberrations with the negative lens located between the second positive lens as counted from the object side and the positive lens on the image side. This negative lens, because of being only one negative lens between the aperture stop and the image side, takes some considerable part in correction of aberrations, and so is severely affected by fabrication errors. By cementing this negative lens to the second positive lens, it is possible to achieve an optical system resistant to fabrication errors. It is also possible to prevent higher-order aberrations from occurring between the second lens and the negative lens, thereby achieving more efficient prevention of chromatic aberrations.

Falling below the lower limit of 2 to condition (6) is not preferable, because the refracting power of the third lens group with respect to the image height becomes too strong. This in turn causes the difference between the center thickness and the peripheral thickness of the positive lens forming the third lens group to become large, resulting in large off-axis aberrations. Exceeding the upper limit of 12 is again not preferable, because the refracting power of the third lens group with respect to the image height becomes too weak. This then makes the aforesaid shadings likely to occur at an upper portion of the image height if the overall length of the zoom lens system is kept short.

According to the sixth aspect of the present invention, there is provided a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said first lens group consists of, in order from an object side thereof, a negative lens component, air, a negative lens component, air and a positive lens component, said third lens group consists of one lens element, an aspherical surface that satisfies the following condition (7) is used at the surface located nearest to object side in said second lens group, and the following condition (4) is satisfied:

$$-1<(1/r_{a2}-1/r_{m2})h_2/(1-n_{a2}')<0 \quad (7)$$

$$0.4<f_3/f_t<2.5 \quad (4)$$

where $r_{a2}$ is the paraxial radius of curvature of an aspherical surface II located in said second lens group, $r_{m2}$ is a distance from a point of intersection of an optical axis with said aspherical surface II located in said second lens group to a point on the optical axis where a normal to an arbitrary point (2) between a diameter that is 7/10 of the maximum diameter of an axial light beam on said aspherical surface II and the maximum diameter of the axial beam on said aspherical surface II is closest to the optical axis, $n_{a2}'$ is the refractive index of the lens element located nearest to the object side in said second lens group, $h_2$ is the height of said point (2) from the optical axis, $f_3$ is the focal length of said third lens group, and $f_t$ is the focal length of said zoom lens system at a telephoto end thereof.

The action and effect of the sixth zoom lens system according to the present invention are now explained.

By moving the first lens group having negative power and the second lens group having positive power for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. To reduce the overall length of the zoom lens system, it is preferable to construct the third lens group of one lens, because the axial length of the third lens group can be reduced.

By constructing the first lens group of a negative lens, a negative lens and a positive lens in such a way that the negative lens components are located on the object side, it is possible to make the outer diameter of the first lens group small. By use of two separate negative lenses, the amounts of various aberrations produced can be reduced. Distortion in particular can be reduced by providing an air spacing between adjacent lenses in the first lens group, rather than cementing them together, thereby imparting an independent radius of curvature to each lens.

The surface located nearest to the object side in the second lens group provides not only a surface across which an axial beam spread but also a surface at which an off-axis light beam is close to the optical axis. By locating an aspherical surface on this surface, it is possible to reduce the occurrence of spherical aberrations without having any influence on astigmatism, distortions, etc.

Condition (7) gives a definition of the shape of the aspherical surface. Falling below the lower limit of −1 is not preferable because spherical aberrations remain undercorrected. Exceeding the upper limit of 0 is again not preferable because the effect of the aspherical surface becomes slender and so the overcorrecting state of the spherical lens manifests itself.

By conforming to condition (4), it is possible to achieve satisfactory image-formation capability and take a good exit pupil position while the third lens group is made up of a reduced number of lenses. When the upper limit of 2.5 is exceeded, it is difficult to locate the exit pupil at a farther position while the total length of the zoom lens system is kept short. When the lower limit of 0.4 is not reached, aberrations produced at the third lens group become too large to maintain performance.

According to the seventh aspect of the present invention, there is provided a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said first lens group consists of, in order from an object side thereof, a negative lens component, air, a negative lens component, air and a positive lens component, said third lens group consists of one lens element, an aspherical surface that satisfies the following condition (7) is used at the surface located nearest to object side in said second lens group, and the following condition (5) is satisfied:

$$-1<(1/r_{a2}-1/r_{m2})h_2/(1-n_{a2}')<0 \quad (7)$$

$$1.2<f_{1-N}/f_{2-N}<2.7 \quad (5)$$

where $r_{a2}$ is the paraxial radius of curvature of an aspherical surface II located in said second lens group, $r_{m2}$ is a distance from a point of intersection of an optical axis with said aspherical surface II located in said second lens group to a point on the optical axis where a normal to an arbitrary point (2) between a diameter that is 7/10 of the maximum diameter of an axial light beam on said aspherical surface II and the maximum diameter of the axial light beam on said aspherical surface II is closest to the optical axis, $n_{a2}'$ is the refractive index of the lens element located nearest to the object side in said second lens group, $h_2$ is the height of said point (2) from the optical axis, $f_{1-N}$ is the focal length of the negative lens component located nearest to the object side in said first lens group, and $f_{2-N}$ is the focal length of the second negative lens component in said first lens group, as counted from the object side.

The action and effect of the seventh zoom lens system according to the present invention are now explained.

By moving the first lens group having negative power and the second lens group having positive power for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. To reduce the overall length of the zoom lens system, it is preferable to construct the third lens group of one lens, because the axial length of the third lens group can be reduced.

By constructing the first lens group of a negative lens, a negative lens and a positive lens in such a way that the negative lens components are located on the object side, it is possible to make the outer diameter of the first lens group small. By use of two separate negative lenses, the amounts of various aberrations produced can be reduced. Distortion in particular can be reduced by providing an air spacing between adjacent lenses in the first lens group, rather than cementing them together, thereby imparting an independent radius of curvature to each lens.

The surface located nearest to the object side in the second lens group provides not only a surface across which an axial beam spread but also a surface at which an off-axis beam is close to the optical axis. By locating an aspherical surface on this surface, it is possible to reduce the occurrence of spherical aberrations without having any influence on astigmatism, distortions, etc.

Condition (7) gives a definition of the shape of the aspherical surface. Falling below the lower limit of −1 is not preferable because spherical aberrations remain undercorrected. Exceeding the upper limit of 0 is again not preferable because the effect of the aspherical surface becomes slender and so the overcorrecting state of the spherical lens manifests itself.

Condition (5) gives a definition of the power ratio between the first lens and the second lens in the first lens group. An off-axis beam on the wide-angle side in particular has not only a large angle of incidence with respect to the optical axis but also a large angle of incidence with respect to the first surface. The first and second lenses have one function of making the angle of this light beam with respect to the optical axis gentle, using four surfaces. By satisfying condition (5), it is possible to make more efficient use of this function. When the lower limit of 1.2 to condition (5) is not reached, it is difficult to make correction for coma and astigmatism produced at the concave lens located nearest to the object side. When the upper limit of 2.7 is exceeded, aberrations produced at the second concave lens from the object side become too large.

According to the eighth aspect of the present invention, there is provided a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said first lens group consists of, in order from an object side thereof, a negative lens component, air, a negative lens component, air and a positive lens component, said third lens group consists of one lens element, an aspherical surface that satisfies the following condition (7) is used at the surface located nearest to object side in said second lens group, and the following condition (6) is satisfied:

$$-1<(1/r_{a2}-1/r_{m2})h_2/(1-n_{a2}')<0 \tag{7}$$

$$2<f_3/IH<12 \tag{6}$$

where $r_{a2}$ is the paraxial radius of curvature of an aspherical surface II located in said second lens group, $r_{m2}$ is a distance from a point of intersection of an optical axis with said aspherical surface II located in said second lens group to a point on the optical axis where a normal to an arbitrary point (2) between a diameter that is 7/10 of the maximum diameter of an axial light beam on said aspherical surface II and the maximum diameter of the axial light beam on said aspherical surface II is closest to the optical axis, $n_{a2}'$ is the refractive index of the lens element located nearest to the object side in said second lens group, $h_2$ is the height of said point (2) from the optical axis, $f_3$ is the focal length of said third lens group, and IH represents an image height.

The action and effect of the eighth zoom lens system according to the present invention are now explained.

By moving the first lens group having negative power and the second lens group having positive power for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. To reduce the overall length of the zoom lens system, it is preferable to construct the third lens group of one lens, because the axial length of the third lens group can be reduced.

By constructing the first lens group of a negative lens, a negative lens and a positive lens in such a way that the negative lens components are located on the object side, it is possible to make the outer diameter of the first lens group small. By use of two separate negative lenses, the amounts of various aberrations produced can be reduced. Distortion in particular can be reduced by providing an air spacing between adjacent lenses in the first lens group, rather than cementing them together, thereby imparting an independent radius of curvature to each lens.

The surface located nearest to the object side in the second lens group provides not only a surface across which an axial beam spread but also a surface at which an off-axis beam is close to the optical axis. By locating an aspherical surface on this surface, it is possible to reduce the occurrence of spherical aberrations without having any influence on astigmatism, distortions, etc.

Condition (7) gives a definition of the shape of the aspherical surface. Falling below the lower limit of −1 is not preferable because spherical aberrations remain undercorrected. Exceeding the upper limit of 0 is again not preferable because the effect of the aspherical surface becomes slender and so the overcorrecting state of the spherical lens manifests itself.

Falling below the lower limit of 2 to condition (6) is not preferable, because the refracting power of the third lens group with respect to the image height becomes too strong. This in turn causes the difference between the center thickness and the peripheral thickness of the positive lens forming the third lens group to become large, resulting in large off-axis aberrations. Exceeding the upper limit of 12 is again not preferable, because the refracting power of the third lens group with respect to the image height becomes too weak. This then makes the aforesaid shadings likely to occur at an upper portion of the image height if the overall length of the zoom lens system is kept short.

According to the ninth aspect of the present invention, there is provided a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, lenses forming said first lens group are all defined by meniscus lens components, each convex on an object side thereof, and the following condition (5) is satisfied:

$$1.2 < f_{1-N}/f_{2-N} < 2.7 \tag{5}$$

where $f_{1-N}$ is the focal length of the negative lens component located nearest to the object side in said first lens group, and $f_{2-N}$ is the focal length of the second negative lens component in said first lens group, as counted from the object side.

The action and effect of the ninth zoom lens system according to the present invention are now explained.

By designing the first lens group having negative power and the second lens group having positive power to move for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. To reduce the overall length of the zoom lens system, it is preferable to construct the third lens group of one lens, because the axial length of the third lens group can be reduced. An off-axis beam on the wide-angle side in particular has not only a large angle of incidence with respect to the optical axis but also a large angle of incidence with respect to the first surface. By using meniscus lenses for the lenses forming the first lens group, rays in this light beam can be bent little by little at the respective surfaces, so that the amount of aberrations produced can be reduced.

In particular, it is preferable to define the power ratio between the first lens and the second lens in such a way as to satisfy condition (5), because the aforesaid effect can be more enhanced. When the lower limit of 1.2 to condition (5) is not reached, it is difficult to make correction for coma and astigmatism produced at the concave lens located nearest to the object side. When the upper limit of 2.7 is exceeded, aberrations produced at the second concave lens from the object side become too large.

According to the tenth aspect of the present invention, there is provided a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, lenses forming said first lens group are all defined by meniscus lens components, each convex on an object side thereof, and the following condition (8) is satisfied:

$$-1.35 < f_1/f_3 < -0.4 \tag{8}$$

where $f_1$ is the focal length of said first lens group, and $f_3$ is the focal length of said third lens group.

The action and effect of the tenth zoom lens system according to the present invention are now explained.

By moving the first lens group having negative power and the second lens group having positive power for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. To reduce the overall length of the zoom lens system, it is preferable to construct the third lens group of one lens, because the axial length of the third lens group can be reduced. An off-axis beam on the wide-angle side in particular has not only a large angle of incidence with respect to the optical axis but also a large angle of incidence with respect to the first surface. By using meniscus lenses for the lenses forming the first lens group, rays in this light beam can be bent little by little at the respective surfaces, so that the amount of aberrations produced can be reduced.

Condition (8) gives a definition of the requirement preferable for locating an exit pupil at a farther position while high zoom ratios and wide field angles are kept. When the upper limit of −0.4 is exceeded, the amount of aberrations produced at the first lens group becomes too large. When the lower limit of −1.35 is not reached, it is impossible to make a reasonable tradeoff between high zoom ratios and size reductions.

According to the eleventh aspect of the present invention, there is provided a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said third lens group consists of one lens element, said second lens group consists of, in order from an object side thereof, a positive lens component, a cemented lens component consisting of a positive lens element and a negative lens element and a positive lens component, and an aspherical surface that satisfies the following condition (7) is used at the surface located nearest to object side in said second lens group:

$$-1 < (1/r_{a2} - 1/r_{m2})h_2/(1 - n_{a2}') < 0 \tag{7}$$

where $r_{a2}$ is the paraxial radius of curvature of an aspherical surface II located in said second lens group, $r_{m2}$ is a distance from a point of intersection of an optical axis with said aspherical surface II located in said second lens group to a point on the optical axis where a normal to an arbitrary point (2) between a diameter that is 7/10 of the maximum diameter of an axial light beam on said aspherical surface II and the maximum diameter of the axial light beam on said aspherical surface II is closest to the optical axis, $n_{a2}'$ is the refractive index of the lens element located nearest to the object side in said second lens group, and $h_2$ is the height of said point (2) from the optical axis.

The action and effect of the eleventh zoom lens system according to the present invention are now explained.

By moving the first lens group having negative power and the second lens group having positive power for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. To reduce the overall length of the zoom lens system, it is preferable to construct the third lens group of one lens, because the axial length of the third lens group can be reduced. When the second lens group is comprised of, in order from an object side thereof, a positive lens, a +– cemented lens and a positive lens, it is possible to suppress the occurrence of spherical aberrations and off-axis coma with two positive lenses located in the vicinity of the aperture stop. The second lens group cooperates at its image-side positive lens with the third lens group to control off-axis aberrations while the exit pupil position is located farther off the image-formation plane, and makes it possible to control chromatic aberrations with the negative lens located between the second positive lens as counted from the object side and the positive lens on the image side. This negative lens, because of being only one negative lens between the aperture stop and the image side, takes some considerable part in correction of aberrations, and so is severely affected by fabrication errors. By cementing this negative lens to the second positive lens, it is possible to achieve an optical system resistant to fabrication errors. It is also possible to prevent higher-order aberrations from occurring between the second lens and the negative lens, thereby achieving more efficient prevention of chromatic aberrations. The surface located nearest to the object side in the second lens group provides not only a surface across which an axial beam spread but also a surface at which an off-axis beam is close to the optical axis. By locating an aspherical surface on this surface, it is possible to reduce the occurrence of spherical aberrations without having any influence on astigmatism, distortions, etc.

Condition (7) gives a definition of the shape of the aspherical surface. Falling below the lower limit of –1 is not preferable because spherical aberrations remain undercorrected. Exceeding the upper limit of 0 is again not preferable because the effect of the aspherical surface becomes slender and so the overcorrecting state of the spherical lens is reflected as such.

According to the twelfth aspect of the present invention, there is provided a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said third lens group consists of one lens element, said second lens group consists of, in order from an object side thereof, a positive lens component, a cemented lens component consisting of a positive lens element and a negative lens element and a positive lens component while the lens located nearest to an image plane side in said second lens group is defined by a meniscus lens component convex on an image plane side thereof, and the following condition (9) is satisfied:

$$2.7 < \Sigma_{2g}/IH < 4.7 \tag{9}$$

where $\Sigma_{2g}$ is a distance on the optical axis from said aperture stop to the surface located nearest to the image plane side in said second lens group, and IH represents an image height.

The action and effect of the twelfth zoom lens system according to the present invention are now explained.

By moving the first lens group having negative power and the second lens group having positive power for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. To reduce the overall length of the zoom lens system, it is preferable to construct the third lens group of one lens, because the axial length of the third lens group can be reduced. When the second lens group is comprised of, in order from an object side thereof, a positive lens, a +– cemented lens and a positive lens, it is possible to suppress the occurrence of spherical aberrations and off-axis coma with two positive lenses located in the vicinity of the aperture stop. The second lens group cooperates at its image-side positive lens with the third lens group to control off-axis aberrations while the exit pupil position is located farther off the image-formation plane, and makes it possible to control chromatic aberrations with the negative lens located between the second positive lens as counted from the object side and the positive lens on the image side. This negative lens, because of being only one negative lens between the aperture stop and the image side, takes some considerable part in correction of aberrations, and so is severely affected by fabrication errors. By cementing this negative lens to the second positive lens, it is possible to achieve an optical system resistant to fabrication errors. It is also possible to prevent higher-order aberrations from occurring between the second positive lens and the negative lens, thereby achieving more efficient prevention of chromatic aberrations. By using a meniscus lens convex on an image plane side thereof for the lens located nearest to the image plane side in the second lens group, it is possible to reduce fluctuations of coma and chromatic aberrations with zooming.

Exceeding the upper limit of 4.7 to condition (9) is not preferable because of an increase in the overall length of the zoom lens system at the telephoto end or during lens collapsing. Falling below the lower limit of 2.7 causes aberrations produced at the second lens group to become larger, and so is not preferable.

According to the thirteenth aspect of the present invention, there is provided a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said third lens group consists of one lens element, said second lens group consists of, in order from an object side thereof, a positive lens component, a cemented lens component consisting of a positive lens element and a negative lens element and a positive lens component while the lens located nearest to an image plane side in said second lens group is defined by a meniscus lens component convex on an image plane side thereof, and the following condition (4) is satisfied:

$$0.4 < f_3/f_t < 2.5 \tag{4}$$

where $f_3$ is the focal length of said third lens group, and $f_t$ is the focal length of the zoom lens system at a telephoto end thereof.

The action and effect of the thirteenth zoom lens system of the present invention are now explained.

By moving the first lens group having negative power and the second lens group having positive power for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. To reduce the overall length of the zoom lens system, it is preferable to construct the third lens group of one lens, because the axial length of the third lens group can be reduced. When the second lens group is comprised of, in order from an object side thereof, a positive lens, a +− cemented lens and a positive lens, it is possible to suppress the occurrence of spherical aberrations and off-axis coma with two positive lenses located in the vicinity of the aperture stop. The second lens group cooperates at its image-side positive lens with the third lens group to control off-axis aberrations while the exit pupil position is located farther off the image-formation plane, and makes it possible to control chromatic aberrations with the negative lens located between the second positive lens as counted from the object side and the positive lens on the image side. This negative lens, because of being only one negative lens between the aperture stop and the image side, takes some considerable part in correction of aberrations, and so is severely affected by fabrication errors. By cementing this negative lens to the second positive lens, it is possible to achieve an optical system resistant to fabrication errors. It is also possible to prevent higher-order aberrations from occurring between the second positive lens and the negative lens, thereby achieving more efficient prevention of chromatic aberrations. By using a meniscus lens convex on an image plane side thereof for the lens located nearest to the image plane side in the second lens group, it is possible to reduce fluctuations of coma and chromatic aberrations with zooming.

By conforming to condition (4), it is possible to achieve satisfactory image-formation capability and take a good exit pupil position while the third lens group is made up of a reduced number of lenses. When the upper limit of 2.5 is exceeded, it is difficult to locate the exit pupil at a farther position while the total length of the zoom lens system is kept short. When the lower limit of 0.4 is not reached, aberrations produced at the third lens group become too large to maintain performance.

According to the fourteenth aspect of the present invention, there is provided a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said third lens group consists of one lens element, said second lens group consists of, in order from an object side thereof, a positive lens component, a cemented lens component consisting of a positive lens element and a negative lens element and a positive lens component while the lens located nearest to an image plane side in said second lens group is defined by a meniscus lens component convex on an image plane side thereof, at least two lens components in said first lens group, as counted from an object side thereof, are defined by negative lens components, and the following condition (5) is satisfied:

$$1.2 < f_{1-N}/f_{2-N} < 2.7 \tag{5}$$

where $f_{1-N}$ is the focal length of the negative lens component located nearest to the object side in said first lens group, and $f_{2-N}$ is the focal length of the second negative lens component in said first lens group, as counted from the object side.

The action and effect of the fourteenth zoom lens system of the present invention are now explained.

By moving the first lens group having negative power and the second lens group having positive power for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. To reduce the overall length of the zoom lens system, it is preferable to construct the third lens group of one lens, because the axial length of the third lens group can be reduced. When the second lens group is comprised of, in order from an object side thereof, a positive lens, a +− cemented lens and a positive lens, it is possible to suppress the occurrence of spherical aberrations and off-axis coma with two positive lenses located in the vicinity of the aperture stop. The second lens group cooperates at its image-side positive lens with the third lens group to control off-axis aberrations while the exit pupil position is located farther off the image-formation plane, and makes it possible to control chromatic aberrations with the negative lens located between the second positive lens as counted from the object side and the positive lens on the image side. This negative lens, because of being only one negative lens between the aperture stop and the image side, takes some considerable part in correction of aberrations, and so is severely affected by fabrication errors. By cementing this negative lens to the second positive lens, it is possible to achieve an optical system resistant to fabrication errors. It is also possible to prevent higher-order aberrations from occurring between the second positive lens and the negative lens, thereby achieving more efficient prevention of chromatic aberrations. By using a meniscus lens convex on an image plane side thereof for the lens located nearest to the image side in the second lens group, it is possible to reduce fluctuations of coma and chromatic aberrations with zooming.

Condition (5) gives a definition of the power ratio between the first lens and the second lens in the first lens group. An off-axis light beam on the wide-angle side in particular has not only a large angle of incidence with respect to the optical axis but also a large angle of incidence with respect to the first surface. The first and second lenses have one function of making the angle of this light beam with respect to the optical axis gentle, using four surfaces. By satisfying condition (5), it is possible to make more efficient use of this function. When the lower limit of 1.2 to condition (5) is not reached, it is difficult to make correction for coma and astigmatism produced at the concave lens located nearest to the object side. When the upper limit of 2.7 is exceeded, aberrations produced at the second concave lens from the object side become too large.

According to the fifteenth aspect of the present invention, there is provided a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said third lens group consists of one lens element, said second lens group consists of, in order from an object side thereof, a positive lens component, a cemented lens component consisting of a positive lens element and a negative lens element and a positive lens component while the lens located nearest to an image plane side in said second lens group is defined by a meniscus lens component convex on an image plane side thereof, and the following condition (6) is satisfied:

$$2 < f_3/IH < 12 \tag{6}$$

where $f_3$ is the focal length of said third lens group, and IH represents an image height.

The action and effect of the fifteenth zoom lens system of the present invention are now explained.

By moving the first lens group having negative power and the second lens group having positive power for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. To reduce the overall length of the zoom lens system, it is preferable to construct the third lens group of one lens, because the axial length of the third lens group can be reduced. When the second lens group is comprised of, in order from an object side thereof, a positive lens, a +− cemented lens and a positive lens, it is possible to suppress the occurrence of spherical aberrations and off-axis coma with two positive lenses located in the vicinity of the aperture stop. The second lens group cooperates at its image-side positive lens with the third lens group to control off-axis aberrations while the exit pupil position is located farther off the image-formation plane, and makes it possible to control chromatic aberrations with the negative lens located between the second positive lens as counted from the object side and the positive lens on the image side. This negative lens, because of being only one negative lens between the aperture stop and the image side, takes some considerable part in correction of aberrations, and so is severely affected by fabrication errors. By cementing this negative lens to the second positive lens, it is possible to achieve an optical system resistant to fabrication errors. It is also possible to prevent higher-order aberrations from occurring between the second positive lens and the negative lens, thereby achieving more efficient prevention of chromatic aberrations. By using a meniscus lens convex on an image plane side thereof for the lens located nearest to the image side in the second lens group, it is possible to reduce fluctuations of coma and chromatic aberrations with zooming.

Falling below the lower limit of 2 to condition (6) is not preferable, because the refracting power of the third lens group with respect to the image height becomes too strong. This in turn causes the difference between the center thickness and the peripheral thickness of the positive lens forming the third lens group to become large, resulting in large off-axis aberrations. Exceeding the upper limit of 12 is again not preferable, because the refracting power of the third lens group with respect to the image height becomes too weak. This then makes the aforesaid shadings likely to occur at an upper portion of the image height if the overall length of the zoom lens system is kept short.

According to the sixteenth aspect of the present invention, there is provided a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said third lens group consists of one lens element, said second lens group consists of, in order from an object side thereof, a positive lens component, a cemented lens component consisting of a positive lens element and a negative lens element and a positive lens component, the thickness ratio between said positive lens element and said negative lens element in said cemented lens component satisfies the following condition (10), and the following condition (4) is satisfied:

$$1.9 < d_{ce1}/d_{ce2} < 12 \tag{10}$$

$$0.4 < f_3/f_t < 2.5 \tag{4}$$

where $d_{ce1}$ is the thickness on an optical axis of said positive lens element of said cemented lens component in said second lens group, $d_{ce2}$ is the thickness on the optical axis of said negative lens element of said cemented lens component in said second lens group, $f_3$ is the focal length of said third lens group, and $f_t$ is the focal length of said zoom lens system at a telephoto end thereof.

The action and effect of the sixteenth zoom lens system of the present invention are now explained.

By moving the first lens group having negative power and the second lens group having positive power for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. To reduce the overall length of the zoom lens system, it is preferable to construct the third lens group of one lens, because the axial length of the third lens group can be reduced. When the second lens group is comprised of, in order from an object side thereof, a positive lens, a +− cemented lens and a positive lens, it is possible to suppress the occurrence of spherical aberrations and off-axis coma with two positive lenses located in the vicinity of the aperture stop. The second lens group cooperates at its image-side positive lens with the third lens group to control off-axis aberrations while the exit pupil position is located farther off the image-formation plane, and makes it possible to control chromatic aberrations with the negative lens located between the second positive lens as counted from the object side and the positive lens on the image side. This negative lens, because of being only one negative lens between the aperture stop and the image side, takes some considerable part in correction of aberrations, and so is severely affected by fabrication errors. By cementing this negative lens to the second positive lens, it is possible to achieve an optical system resistant to fabrication errors. It is also possible to prevent higher-order aberrations from occurring between the second positive lens and the negative lens, thereby achieving more efficient prevention of chromatic aberrations.

By determining the thickness ratio between the positive lens and the negative lens cemented thereto in such a way as to satisfy condition (10), it is easy to make a reasonable tradeoff between compactness and prevention of the occurrence of astigmatism in particular. Falling below the lower limit of 1.9 to condition (10) renders correction of astigmatism difficult and so is not preferable. Exceeding the upper limit of 12 is again not preferable, because the cemented lens becomes too thick to achieve compactness.

By conforming to condition (4), it is possible to achieve satisfactory image-formation capability and take a good exit pupil position while the third lens group is made up of a reduced number of lenses. When the upper limit of 2.5 is exceeded, it is difficult to locate the exit pupil at a farther position while the total length of the zoom lens system is kept short. When the lower limit of 0.4 is not reached, aberrations produced at the third lens group become too large to maintain performance.

According to the seventeenth aspect of the present invention, there is provided a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said third lens group consists of one lens element, said second lens group consists of, in order from an object side thereof, a positive lens component, a cemented lens component consisting of a positive lens element and a negative lens element and a positive lens component, the thickness ratio between said positive lens element and said negative lens element in said cemented lens component satisfies the following condition (10), at least two lens components nearest to the object side in said first lens group are defined by negative lens components, and the following condition (5) is satisfied:

$$1.9 < d_{ce1}/d_{ce2} < 12 \tag{10}$$

$$1.2 < f_{1-N}/f_{2-N} < 2.7 \tag{5}$$

where $d_{ce1}$ is the thickness on an optical axis of said positive lens element of said cemented lens component in said second lens group, $d_{ce2}$ is the thickness on the optical axis of said negative lens element of said cemented lens component in said second lens group, $f_{1-N}$ is the focal length of the negative lens component located nearest to the object side in said first lens group, and $f_{2-N}$ is the focal length of the second negative lens component in said first lens group, as counted from the object side.

The action and effect of the seventeenth zoom lens system of the present invention are now explained.

By moving the first lens group having negative power and the second lens group having positive power for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. To reduce the overall length of the zoom lens system, it is preferable to construct the third lens group of one lens, because the axial length of the third lens group can be reduced. When the second lens group is comprised of, in order from an object side thereof, a positive lens, a +− cemented lens and a positive lens, it is possible to suppress the occurrence of spherical aberrations and off-axis coma with two positive lenses located in the vicinity of the aperture stop. The second lens group cooperates at its image-side positive lens with the third lens group to control off-axis aberrations while the exit pupil position is located farther off the image-formation plane, and makes it possible to control chromatic aberrations with the negative lens located between the second positive lens as counted from the object side and the positive lens on the image side. This negative lens, because of being only one negative lens between the aperture stop and the image side, takes some considerable part in correction of aberrations, and so is severely affected by fabrication errors. By cementing this negative lens to the second positive lens, it is possible to achieve an optical system resistant to fabrication errors. It is also possible to prevent higher-order aberrations from occurring between the second positive lens and the negative lens, thereby achieving more efficient prevention of chromatic aberrations.

By determining the thickness ratio between the positive lens and the negative lens cemented thereto in such a way as to satisfy condition (10), it is easy to make a reasonable tradeoff between compactness and prevention of the occurrence of astigmatism in particular. Falling below the lower limit of 1.9 to condition (10) renders correction of astigmatism difficult and so is not preferable. Exceeding the upper limit of 12 is again not preferable, because the cemented lens becomes too thick to achieve compactness.

According to the eighteenth aspect of the present invention, there is provided a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said third lens group consists of one lens element, said second lens group consists of, in order from an object side thereof, a positive lens component, a cemented lens component consisting of a positive lens element and a negative lens element and a positive lens component, the thickness ratio between said positive lens element and said negative lens element in said cemented lens component satisfies the following condition (10), and the following condition (6) is satisfied:

$$1.9 < d_{ce1}/d_{ce2} < 12 \quad (10)$$

$$3 < f_3/IH < 12 \quad (6)$$

where $d_{ce1}$ is the thickness on an optical axis of said positive lens element of said cemented lens component in said second lens group, $d_{ce2}$ is the thickness on an optical axis of said negative lens element of said cemented lens component in said second lens group, $f_3$ is the focal length of said third lens group, and IH represents an image height.

The action and effect of the eighteenth zoom lens system of the present invention are now explained.

By moving the first lens group having negative power and the second lens group having positive power for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. To reduce the overall length of the zoom lens system, it is preferable to construct the third lens group of one lens, because the axial length of the third lens group can be reduced. When the second lens group is comprised of, in order from an object side thereof, a positive lens, a +− cemented lens and a positive lens, it is possible to suppress the occurrence of spherical aberrations and off-axis coma with two positive lenses located in the vicinity of the aperture stop. The second lens group cooperates at its image-side positive lens with the third lens group to control off-axis aberrations while the exit pupil position is located farther off the image-formation plane, and makes it possible to control chromatic aberrations with the negative lens located between the second positive lens as counted from the object side and the positive lens on the image side. This negative lens, because of being only one negative lens between the aperture stop and the image side, takes some considerable part in correction of aberrations, and so is severely affected by fabrication errors. By cementing this negative lens to the second positive lens, it is possible to achieve an optical system resistant to fabrication errors. It is also possible to prevent higher-order aberrations from occurring between the second positive lens and the negative lens, thereby achieving more efficient prevention of chromatic aberrations.

By determining the thickness ratio between the positive lens and the negative lens cemented thereto in such a way as to satisfy condition (10), it is easy to make a reasonable tradeoff between compactness and prevention of the occurrence of astigmatism in particular. Falling below the lower limit of 1.9 to condition (10) renders correction of astigmatism difficult and so is not preferable. Exceeding the upper limit of 12 is again not preferable, because the cemented lens becomes too thick to achieve compactness.

Falling below the lower limit of 2 to condition (6) is not preferable, because the refracting power of the third lens group with respect to the image height becomes too strong. This in turn causes the difference between the center thickness and the peripheral thickness of the positive lens forming the third lens group to become large, resulting in large off-axis aberrations. Exceeding the upper limit of 12 is again not preferable, because the refracting power of the third lens group with respect to the image height becomes too weak. This then makes the aforesaid shadings likely to occur at an upper portion of the image height if the overall length of the zoom lens system is kept short.

According to the nineteenth aspect of the present invention, there is provided a zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said first lens group consists of, in order from an object side thereof, a negative lens component, a negative lens component and a positive lens component, and said third lens group consists of one lens element having on the object side an aspherical surface that satisfies the following condition (2):

$$-1 < (1/r_{a3} - 1/r_{m3})h_3/(n_{a3} - n_{a3}') < 0 \quad (2)$$

where $r_{a3}$ is the paraxial radius of curvature of an aspherical surface III located in said third lens group, $r_{m3}$ is a distance from a point of intersection of the optical axis with said aspherical surface III located in said third lens group to a point on the optical axis where a normal to an arbitrary point (3) between the maximum diameter of an axial light beam on said aspherical surface III and an effective diameter including an off-axis light beam said aspherical surface III is closest to the optical axis, $n_{a3}$ is the refractive index of said aspherical surface III on an object side thereof, $n_{a3}'$ is the refractive index of said aspherical surface III on an image side thereof, and $h_3$ is the height of said point (3) from the optical axis.

The action and effect of the nineteenth zoom lens system according to the present invention are now explained.

By moving the first lens group having negative power and the second lens group having positive power for zooming, it is possible to impart, with simple construction, a wide field angle to the zoom lens system at the wide-angle end in particular, and make the zoom lens system compact while satisfactory performance is kept. With the third lens group having positive power and designed to be fixed during zooming and the aperture stop designed to move in unison with the second lens group for zooming, it is possible to set up an exit pupil position suitable for an electronic image pickup device. In other words, it is possible to locate the exit pupil at a position farther off an image-formation plane with shadings, etc. mind. To reduce the overall length of the zoom lens system, it is preferable to construct the third lens group of one lens, because the axial length of the third lens group can be reduced.

The third lens group has a little influence on deterioration of aberrations with respect to axial beams. At the third lens group, however, off-axis beams and especially astigmatism are likely to occur. By increasing the number of lenses to form the third lens group, image-formation capability may be enhanced depending on the performance, etc. of the image pickup device. In the present invention, however, the third lens group is composed of one positive lens by the introduction of the aspherical surface that satisfies condition (2). By satisfying condition (2), the difference between the center thickness and peripheral thickness of the lens can be narrowed, thereby reducing the amount of astigmatism produced when the zoom lens system is used on an image pickup device required to have high image-formation capability as represented by an increased number of pixels. Especially if the aspherical surface is located on the object side where an off-axis light beam is at an angle with respect to the optical axis and the angle of incidence of the off-axis light beam on the lens tends to become large, correction of astigmatism and coma can then be advantageously achieved while the overall length of the zoom lens system is kept short with the exit pupil located at a farther position. When the upper limit of 0 to condition (2) is exceeded, the aspherical surface loses its own effect, and so fails to reduce astigmatism. Falling below the lower limit of −1 is not preferable, because off-axis light beams strike on an image pickup plane from a largely oblique direction with respect to the vertical direction under an adverse influence on a substantial exit pupil position with respect to off-axis light beams.

The symbols used in the aforesaid conditions (1), (2), (3) and (7) are now defined.

FIG. 13 shows one exemplary shape of aspherical surface I in the first lens group with explanations of the symbols used for condition (1) with respect thereto.

For simplification of explanation, here assume that the aspherical surface I is rotationally symmetric. In FIG. 13, a spherical surface based on the curvature of the aspherical surface I on the optical axis is indicated by a broken line. The radius of curvature of this spherical surface corresponds to the paraxial radius of curvature, $r_{a1}$, of the aspherical surface I. An arbitrary point on the aspherical surface I between the maximum diameter $A_1$ of an axial light beam and an effective diameter $B_1$ including an off-axis light beam is indicated at (1). Then, a normal to a surface from the point (1) is indicated at L(1). When the aspherical surface I is rotationally symmetric with respect to the optical axis, the normal L(1) intersects the optical axis at a point, as shown in FIG. 13. In this case, the distance from the point of intersection of the aspherical surface I with the optical axis to the point of intersection of the optical axis with the normal L(1) is defined by $r_{m1}$. The height from the optical axis to the point (1) is defined by $h_1$, as shown.

As mentioned above, the aspherical surface I is assumed to be rotationally symmetric with respect to the optical axis; however, it is not always required to be rotationally symmetric with respect to the optical axis. For instance, when the aspherical surface I is a rotationally asymmetric surface or a rotationally symmetric surface where the optical axis does not provide an axis of rotational symmetry, the aforesaid normal L(1) does not intersect the optical axis, and so has a torsional relation thereto. In this case, $r_{m1}$ is defined by the distance from the point of intersection of the optical axis with the aspherical surface I to the "point on the optical axis where the normal L(1) to the point (1) is closest to the optical axis".

More specifically, the aforesaid "point on the optical axis where the normal L(1) to the point (1) is closest to the optical axis" is represented by an arbitrary point on the optical axis in the state where the distance from an arbitrary point on the optical axis to an arbitrary point on the normal L(1) is shortest.

In the range of such definition, it is preferable to satisfy condition (1) as already mentioned.

It is here noted that whenever there is an arbitrary point (1) satisfying condition (1), the desired effect is achievable; in other words, it is not required to satisfy condition (1) with respect to all points on the aspherical surface I between the maximum diameter $A_1$ of the axial light beam and the effective diameter $B_1$ including an off-axis light beam.

FIG. 14 shows one exemplary shape of aspherical surface III in the third lens group with explanations of the symbols used for condition (2) with respect thereto.

Roughly speaking, the same explained with reference to the aspherical surface I holds for III. In FIG. 14, a spherical surface based on the curvature of the aspherical surface III on the optical axis is indicated by a broken line. The radius of curvature of this spherical surface corresponds to the paraxial radius of curvature, $r_{a3}$, of the aspherical surface III. An arbitrary point on the aspherical surface III between the maximum diameter $A_3$ of an axial light beam and an effective diameter $B_3$ including an off-axis light beam is indicated at (3). Then, a normal to a surface from the point (3) is indicated at L(3). In this case, the distance from the point of intersection of the aspherical surface III with the optical axis to the point of intersection of the optical axis with the normal L(3) is defined by $r_{m1}$. The height from the optical axis to the point (3) is defined by $h_3$, as shown.

In this case, too, the aspherical surface III is not always required to be rotationally symmetric with respect to the optical axis. For instance, when the aspherical surface III is provided by a rotationally asymmetric surface or a rotationally symmetric surface where the optical axis does not provide an axis of rotational symmetry, $r_{m3}$ is defined by the distance from the point of intersection of the optical axis with the aspherical surface III to the "point on the optical axis where the normal L(3) to the point (3) is closest to the optical axis".

More specifically, the aforesaid "point on the optical axis where the normal L(3) to the point (3) is closest to the optical axis" is represented by an arbitrary point on the optical axis in the state where the distance from an arbitrary point on the optical axis to an arbitrary point on the normal L(3) is shortest.

In the range of such definition, it is preferable to satisfy condition (2) as already mentioned.

FIG. 15 shows one exemplary shape of aspherical surface II in the second lens group with explanations of the symbols used for condition (7) with respect thereto.

Roughly speaking, the same explained with reference to the aspherical surface I holds for II. In FIG. 15, a spherical surface based on the curvature of the aspherical surface II on the optical axis is indicated by a broken line. The radius of curvature of this spherical surface corresponds to the paraxial radius of curvature, $r_{a2}$, of the aspherical surface II. An arbitrary point on the aspherical surface II between a diameter C that is 7/10 of the maximum diameter $A_2$ and the maximum diameter $A_2$ of an axial light beam is indicated at (2). Then, a normal to a surface from the point (2) is indicated at L(2). In this case, the distance from the point of intersection of the aspherical surface II with the optical axis to the point of intersection of the optical axis with the normal L(2) is defined by $r_{m2}$. The height from the optical axis to the point (2) is defined by $h_2$, as shown.

In this case, too, the aspherical surface II is not always required to be rotationally symmetric with respect to the optical axis. For instance, when the aspherical surface II is provided by a rotationally asymmetric surface or a rotationally symmetric surface where the optical axis does not provide an axis of rotational symmetry, $r_{m2}$ is defined by the distance from the point of intersection of the optical axis with the aspherical surface II to the "point on the optical axis where the normal L(2) to the point (2) is closest to the optical axis".

More specifically, the aforesaid "point on the optical axis where the normal L(2) to the point (2) is closest to the optical axis" is represented by an arbitrary point on the optical axis in the state where the distance from an arbitrary point on the optical axis to an arbitrary point on the normal L(2) is shortest.

In the range of such definition, it is preferable to satisfy condition (7) as already mentioned, because spherical aberrations can be well corrected.

FIG. 16 shows one exemplary construction of aspherical surface I obtained by coating a resin on the concave surface in the first lens group with explanations of symbols used for condition (3) with respect thereto.

Referring to FIG. 16, a broken line shows a concave surface on which a resin is coated to form an aspherical surface I located in the first lens group, with the paraxial radius of curvature of the concave surface being indicated at $r_{a1}'$. An arbitrary point on the aspherical surface I between the maximum diameter $A_1$ of an axial light beam and an effective diameter $B_1$ including an off-axis light beam is indicated at (1). Then, a normal to a surface from the point (1) is indicated at L(1). In this case, the distance from the point of intersection of the aspherical surface I with the optical axis to the point of intersection of the optical axis with the normal L(1) is defined by $r_{m1}$. The height from the optical axis to the point (1) is defined by $h_1$, as shown.

In this case, too, the aspherical surface I is not always required to be rotationally symmetric with respect to the optical axis. For instance, when the aspherical surface III is provided by a rotationally asymmetric surface or a rotationally symmetric surface where the optical axis does not provide an axis of rotational symmetry, $r_{m1}$ is defined by the distance from the point of intersection of the optical axis with the aspherical surface I to the "point on the optical axis where the normal L(1) to the point (1) is closest to the optical axis".

More specifically, the aforesaid "point on the optical axis where the normal L(1) to the point (1) is closest to the optical axis" is represented by an arbitrary point on the optical axis in the state where the distance from an arbitrary point on the optical axis to an arbitrary point on the normal L(1) is shortest.

In the range of such definition, it is preferable to satisfy condition (3) as already mentioned.

Still other objects and advantages of the present invention will in part be obvious and will in part be apparent from the specification.

The present invention accordingly comprises the features of construction, combinations of elements, and arrangement of parts which will be exemplified in the construction hereinafter set forth, and the scope of the present invention will be indicated in the claims.

DESCRIPTION OF THE PREFERRED EMBODIMENTS

Examples 1 to 11 of the zoom lens system according to the present invention are now explained.

FIGS. 1 to 11 are sectional views illustrative of the lens arrangements of Examples 1 through 11 of the present zoom lens system at their wide-angle ends. Numerical data on each example will be enumerated later. Throughout FIGS. 1 to 11, plane-parallel plates are located between the third lens group G3 and the image plane. These are filters such as IR cut filters, low-pass filters, and cover glasses for image pickup devices. These plane-parallel plates are omitted from the numerical data given later.

Figure 1:
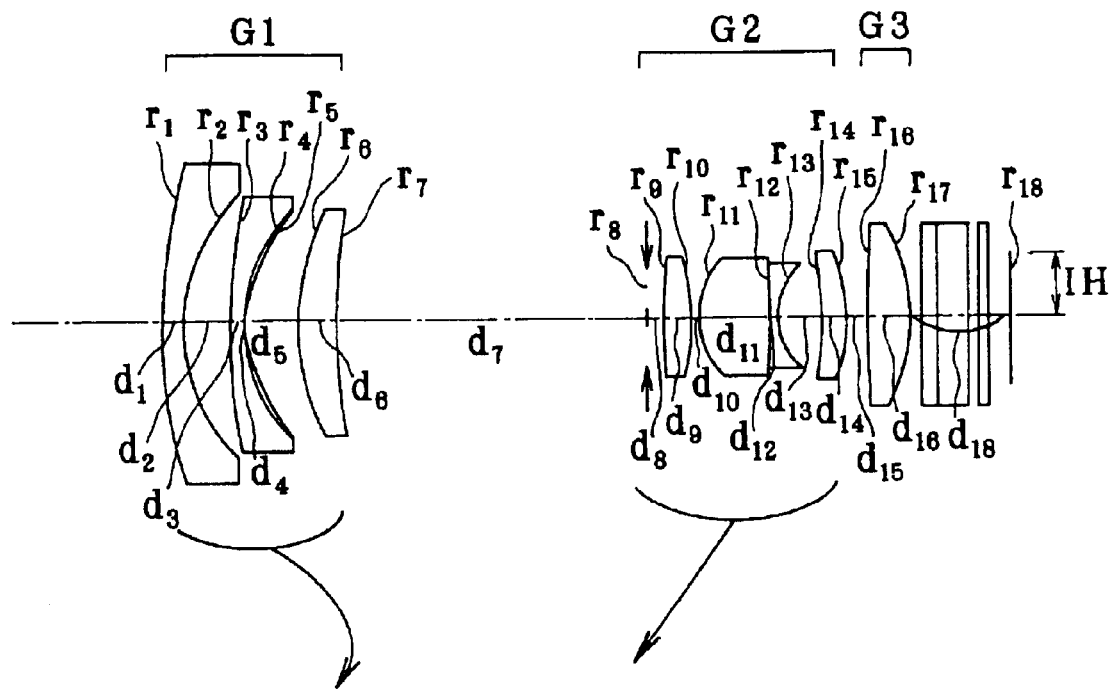
FIG. 1 shows in section Example 1 of the zoom lens system according to the present invention at its wide-angle end.

Example 1 is directed to a zoom lens system having a focal length of 4.386 to 12.642 mm, an F-number of 2.36 to 3.99, a half field angle of 37.9 to 14.4° and an image height of 3.32 mm. As shown in FIG. 1, the first lens group G1 is made up of a negative meniscus lens convex on an object side thereof, a negative meniscus lens convex on an object side thereof, which is coated on a concave surface with a thin resin to form an aspherical surface thereon, and a positive meniscus lens convex on an object side-thereof. The second lens group G2 is made up of a stop located on an object side thereof, a double-convex lens, a cemented lens consisting of a double-convex lens and a double-concave lens, and a positive meniscus lens convex on an image plane side thereof. The third lens group G3 is made up of one convex lens. Three aspherical surfaces are used; one for the resin aspherical surface formed on the second negative meniscus lens in the first lens group G1, one for the surface located nearest to the object side in the second lens group G2, and one for the object-side surface of the double-convex lens in the third lens group G3. For zooming the wide-angle end to the telephoto end of the zoom lens system, the first lens group G1 moves from the object side toward the image plane side, and then goes back slightly to the object side, as indicated by arrows. The second lens group G2 moves from the image plane side to the object side. The third lens group G3 remains fixed.

Figure 2:
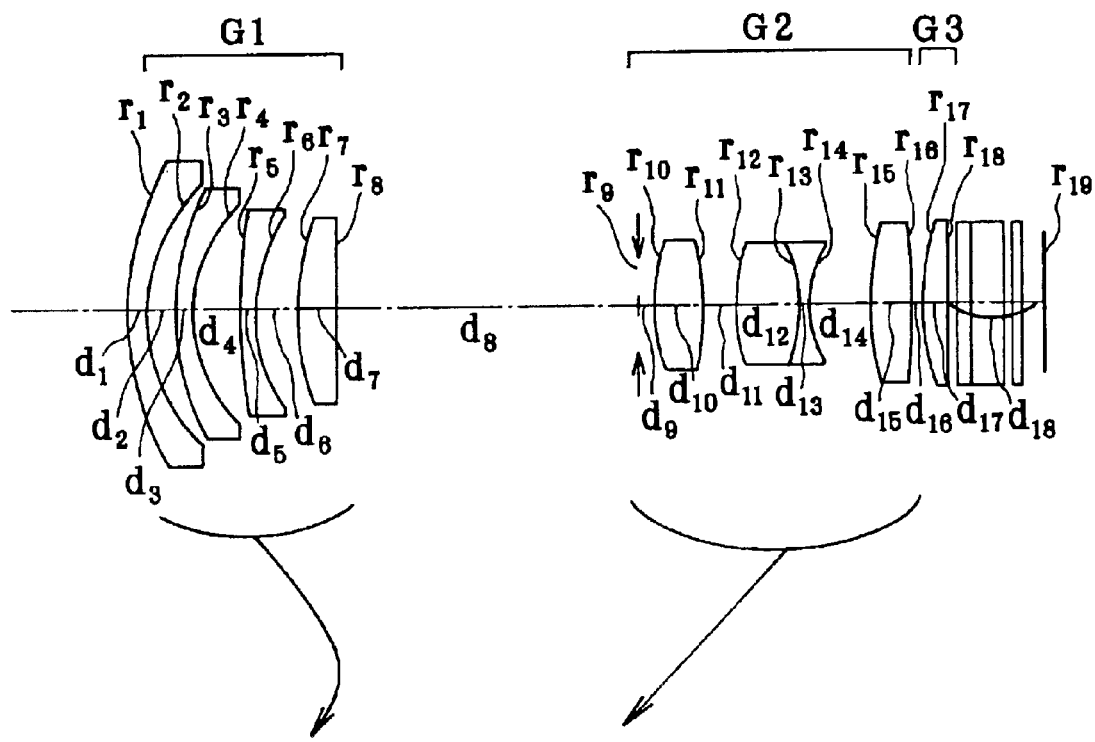
FIG. 2 shows in section Example 2 of the zoom lens system according to the present invention at its wide-angle end.

Example 2 is directed to a zoom lens system having a focal length of 4.375 to 12.649 mm, an F-number of 2.83 to 4.62, a half field angle of 37.8 to 15.8° and an image height of 3.32 mm. As shown in FIG. 2, the first lens group G1 is made up of three negative meniscus lenses each convex on an object side thereof and a positive meniscus lens convex on an object side thereof. The second lens group G2 is made up of a stop located on an object side thereof, a double-convex lens, a cemented lens consisting of a double-convex lens and #a double-concave lens and a double-convex lens, and the third lens group G3 is made up of one double-convex lens. Three aspherical surfaces are used; one for the image plane-side surface of the third negative meniscus lens in the first lens group G1, one for the surface located nearest to the object side in the second lens group G2, and one for the object-side surface of the double-convex lens in the third lens group G3. For zooming the wide-angle end to the telephoto end of the zoom lens system, the first lens group G1 moves from the object side toward the image plane side, and then goes back slightly to the object side, as indicated by arrows. The second lens group G2 moves from the image plane side to the object side. The third lens group G3 remains fixed.

Figure 3:
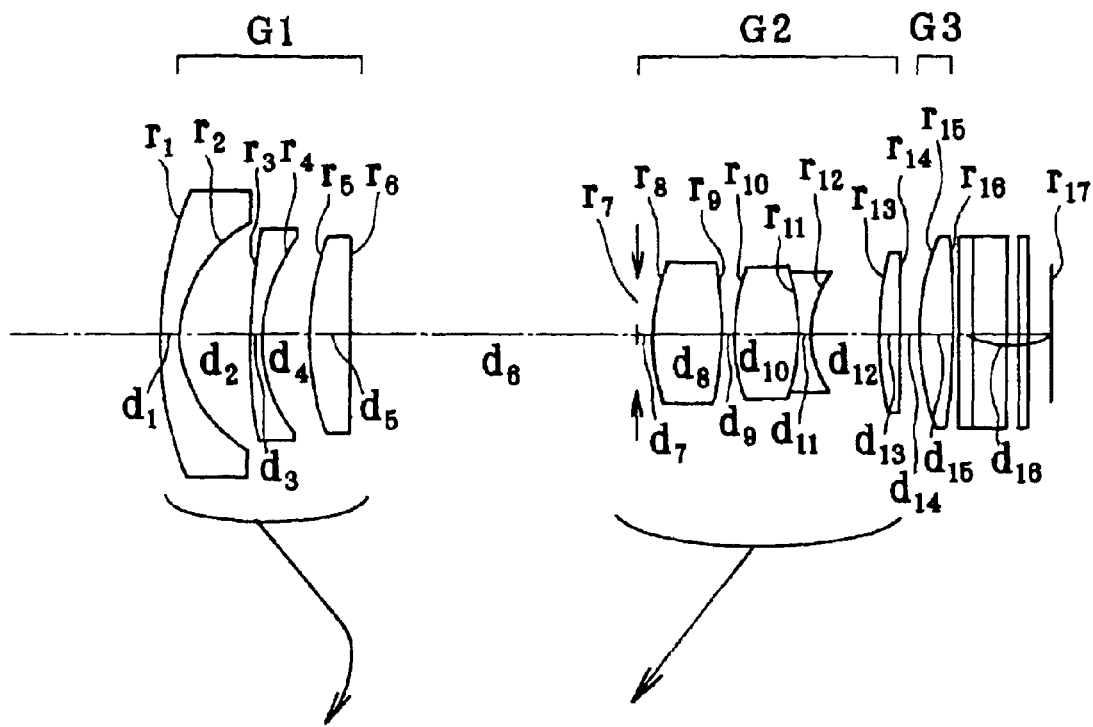
FIG. 3 shows in section Example 3 of the zoom lens system according to the present invention at its wide-angle end.

Example 3 is directed to a zoom lens system having a focal length of 4.374 to 12.649 mm, an F-number of 2.31 to 4.00, a half field angle of 37.9 to 15.8° and an image height of 3.32 mm. As shown in FIG. 3, the first lens group G1 is made up of two negative meniscus lenses each convex on an object side thereof and a positive meniscus lens convex on an object side thereof. The second lens group G2 is made up of a stop located on an object side thereof, a double-convex lens, a cemented lens consisting of a double-convex lens and a double-concave lens and a positive meniscus lens convex on an object side thereof, and the third lens group G3 is made up of one double-convex lens. Three aspherical surfaces are used; one for the image plane-side surface of the second negative meniscus lens in the first lens group G1, one for the surface located nearest to the object side in the second lens group G2, and one for the object-side surface of the double-convex lens in the third lens group G3. For zooming the wide-angle end to the telephoto end of the zoom lens system, the first lens group G1 moves from the object side toward the image plane side, and then goes back slightly to the object side, as indicated by arrows. The second lens group G2 moves from the image plane side to the object side. The third lens group G3 remains fixed.

Figure 4:
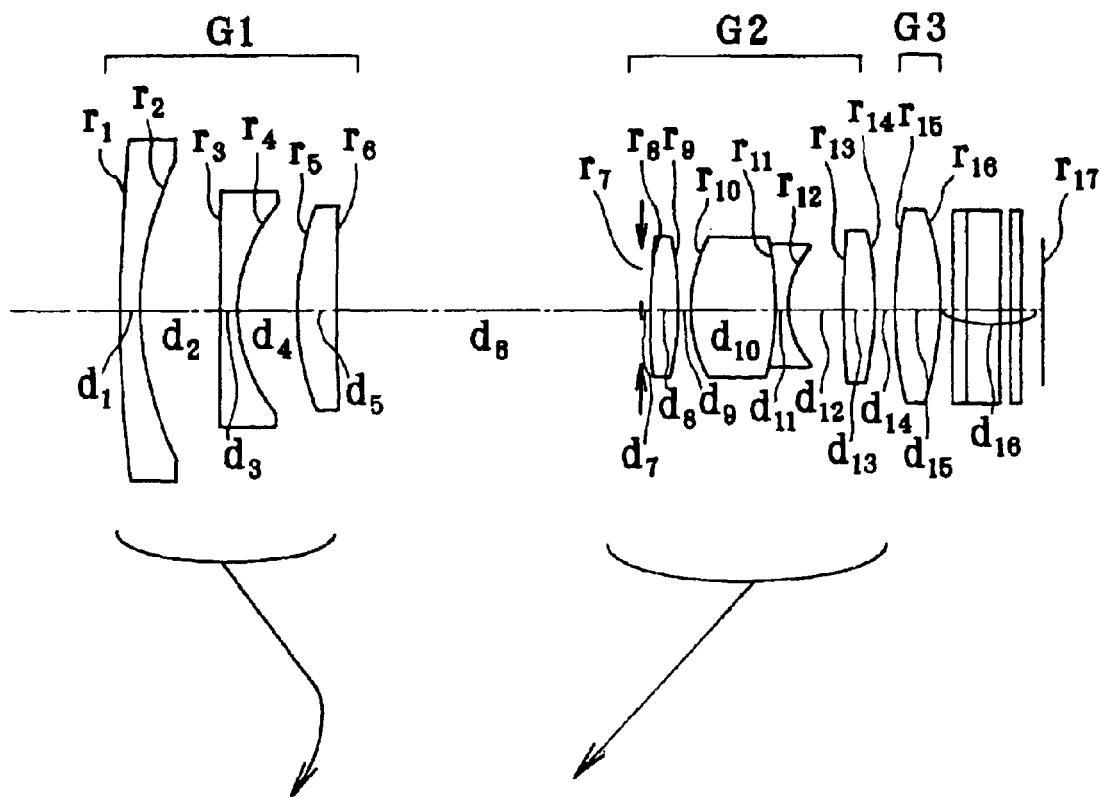
FIG. 4 shows in section Example 4 of the zoom lens system according to the present invention at its wide-angle end.

Example 4 is directed to a zoom lens system having a focal length of 4.374 to 12.648 mm, an F-number of 2.31 to 4.00, a half field angle of 38.0 to 15.6° and an image height of 3.32 mm. As shown in FIG. 4, the first lens group G1 is made up of two negative meniscus lenses each convex on an object side thereof and a positive meniscus lens convex on an object side thereof. The second lens group G2 is made up of a stop located on an object side thereof, a double-convex lens, a cemented lens consisting of a double-convex lens and a double-concave lens and a double-convex lens, and the third lens group G3 is made up of one double-convex lens. Three aspherical surfaces are used; one for the image plane-side surface of the first negative meniscus lens in the first lens group G1, one for the surface located nearest to the object side in the second lens group G2, and one for the object-side surface of the double-convex lens in the third lens group G3. For zooming the wide-angle end to the telephoto end of the zoom lens system, the first lens group G1 moves from the object side toward the image plane side, and then goes back slightly to the object side, as indicated by arrows. The second lens group G2 moves from the image plane side to the object side. The third lens group G3 remains fixed.

Figure 5:
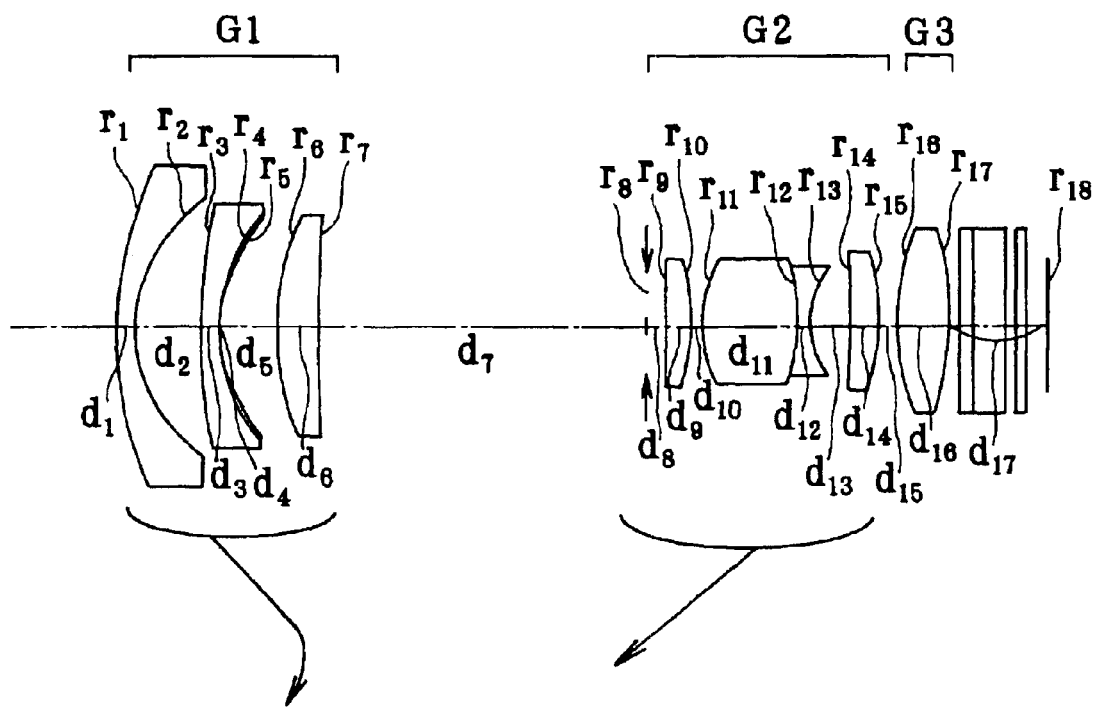
FIG. 5 shows in section Example 5 of the zoom lens system according to the present invention at its wide-angle end.

Example 5 is directed to a zoom lens system having a focal length of 4.387 to 12.643 mm, an F-number of 2.42 to 4.09, a half field angle of 37.9 to 14.9° and an image height of 3.32 mm. As shown in FIG. 5, the first lens group G1 is made up of a negative meniscus lens convex on an object side thereof, a negative meniscus lens convex on an object side thereof, which is coated on a concave surface with a thin resin to form an aspherical surface thereon, and a positive meniscus lens convex on an object side thereof. The second lens group G2 is made up of a stop located on an object side thereof, a double-convex lens, a cemented lens consisting of a double-convex lens and a double-concave lens and a positive meniscus lens convex on an image plane side thereof, and the third lens group G3 is made up of one double-convex lens. Two aspherical surfaces are used; one for the resin aspherical surface formed on the second negative meniscus lens in the first lens group G1, and another for the surface located nearest to the object side in the second lens group G2. For zooming the wide-angle end to the telephoto end of the zoom lens system, the first lens group G1 moves from the object side toward the image plane side, and then goes back slightly to the object side, as indicated by arrows. The second lens group G2 moves from the image plane side to the object side. The third lens group G3 remains fixed.

Figure 6:
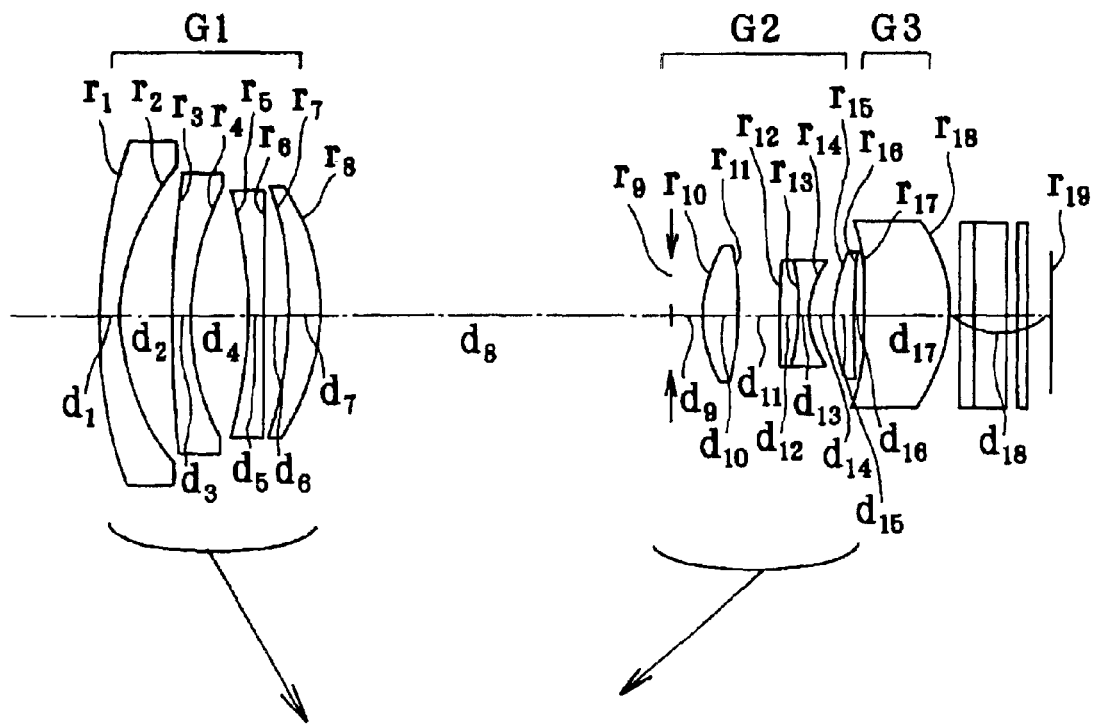
FIG. 6 shows in section Example 6 of the zoom lens system according to the present invention at its wide-angle end.

Example 6 is directed to a zoom lens system having a focal length of 4.371 to 12.622 mm, an F-number of 2.32 to 4.00, a half field angle of 38.1 to 13.9° and an image height of 3.32 mm. As shown in FIG. 6, the first lens group G1 is made up of two negative meniscus lenses each convex on an object side thereof, a negative meniscus lens convex on an image plane side thereof and a positive meniscus lens convex on an object side thereof. The second lens group G2 is made up of a stop located on an object side thereof, a double-convex lens, a cemented lens consisting of a double-convex lens and a double-concave lens and a positive meniscus lens convex on an object side thereof, and the third lens group G3 is made up of one double-convex lens. Three aspherical surfaces are used; one for the surface located nearest to object side in the second lens group G2, one for the object-side surface of the cemented lens in the second lens group G2, and one for the object-side surface of the double-convex lens in the third lens group G3. For zooming the wide-angle end to the telephoto end of the zoom lens system, the first lens group G1 moves from the object side toward the image plane side, and then goes back slightly to the object side, as indicated by arrows. The second lens group G2 moves from the image plane side to the object side. The third lens group G3 remains fixed.

Figure 7:
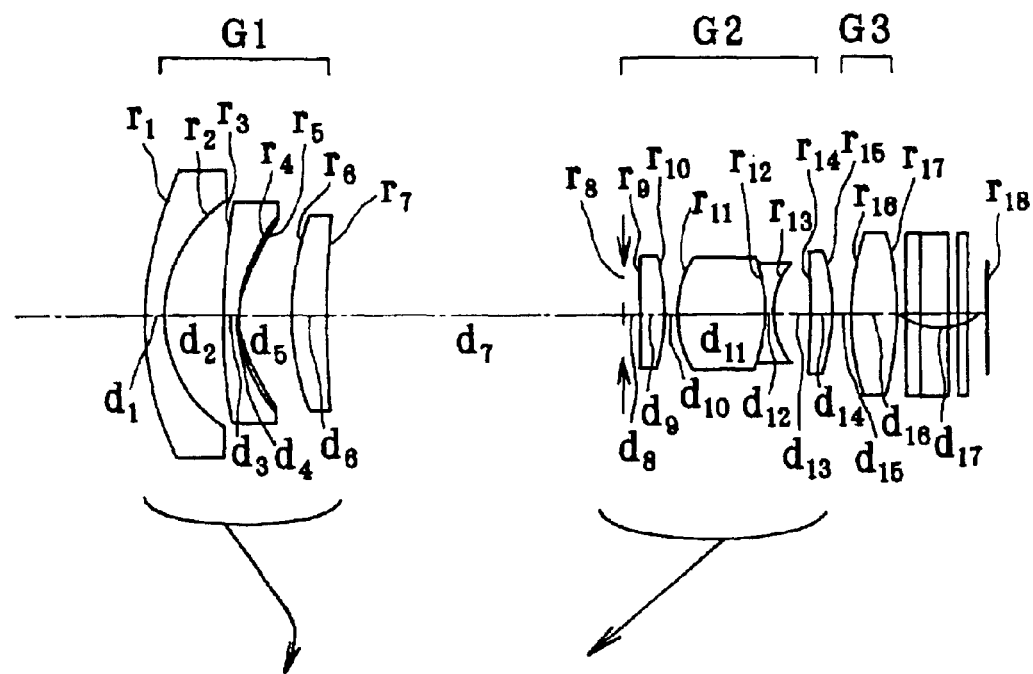
FIG. 7 shows in section Example 7 of the zoom lens system according to the present invention at its wide-angle end.

Example 7 is directed to a zoom lens system having a focal length of 2.973 to 8.568 mm, an F-number of 2.42 to 4.09, a half field angle of 37.9 to 14.4° and an image height of 2.25 mm. As shown in FIG. 7, the first lens group G1 is made up of a negative meniscus lens convex on an object side thereof, a negative meniscus lens convex on an object side thereof, which is coated on a concave surface with a thin resin to form an aspherical surface thereon, and a positive meniscus lens convex on an object side thereof. The second lens group G2 is made up of a stop located on an object side thereof, a double-convex lens, a cemented lens consisting of a double-convex lens and a double-concave lens and a positive meniscus lens convex on an image plane side thereof, and the third lens group G3 is made up of one double-convex lens. Two aspherical surfaces are used; one for the resin aspherical surface formed on the second negative meniscus lens in the first lens group G1, and another for the surface located nearest to the object side in the second lens group G2. For zooming the wide-angle end to the telephoto end of the zoom lens system, the first lens group G1 moves from the object side toward the image plane side, and then goes back slightly to the object side, as indicated by arrows. The second lens group G2 moves from the image plane side to the object side. The third lens group G3 remains fixed.

Figure 8:
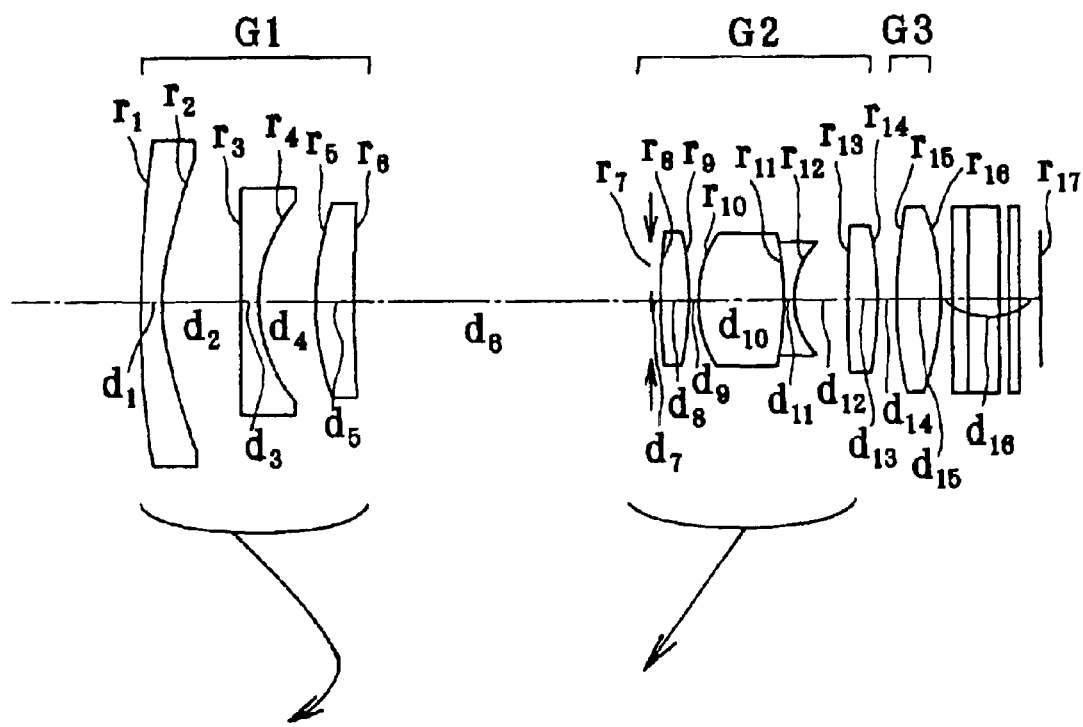
FIG. 8 shows in section Example 8 of the zoom lens system according to the present invention at its wide-angle end.

Example 8 is directed to a zoom lens system having a focal length of 3.293 to 9.524 mm, an F-number of 2.31 to 4.00, a half field angle of 38.0 to 15.6° and an image height of 2.5 mm. As shown in FIG. 8, the first lens group G1 is made up of a positive meniscus lens convex on an object side thereof, a double-concave lens and a positive meniscus lens convex on an object side thereof. The second lens group G2 is made up of a stop located on an object side thereof, a double-convex lens, a cemented lens consisting of a double-convex lens and a double-concave lens and a double-convex lens, and the third lens group G3 is made up of one double-convex lens. Three aspherical surfaces are used; one for the image plane-side surface of the negative meniscus lens in the first lens group G1, one for the surface located to the object side in the second lens group G2, and one for the object-side surface of the double-convex lens in the third lens group G3. For zooming the wide-angle end to the telephoto end of the zoom lens system, the first lens group G1 moves from the object side toward the image plane side, and then goes back slightly to the object side, as indicated by arrows. The second lens group G2 moves from the image plane side to the object side. The third lens group G3 remains fixed.

Figure 9:
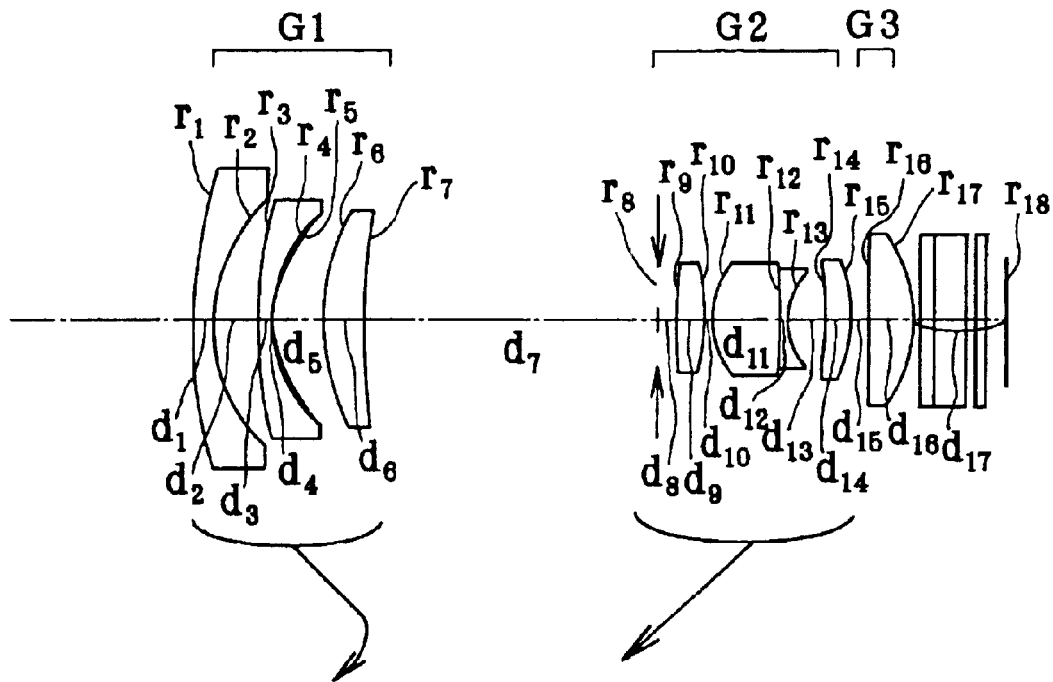
FIG. 9 shows in section Example 9 of the zoom lens system according to the present invention at its wide-angle end.

Example 9 is directed to a zoom lens system having a focal length of 2.378 to 6.854 mm, an F-number of 2.36 to 3.99, a half field angle of 37.9 to 14.4° and an image height of 1.8 mm. As shown in FIG. 9, the first lens group G1 is made up of a negative meniscus lens convex on an object side thereof, a negative meniscus lens convex on an object side thereof, which is coated on a concave surface with a thin resin to form an aspherical surface thereon, and a positive meniscus lens convex on an object side thereof. The second lens group G2 is made up of a stop located on an object side thereof, a double-convex lens, a cemented lens consisting of a double-convex lens and a double-concave lens and a positive meniscus lens convex on an image plane side thereof, and the third lens group G3 is made up of one double-convex lens. Three aspherical surfaces are used; one for the resin aspherical surface formed on the second negative meniscus lens in the first lens group G1, one for the surface located nearest to the object side in the second lens group G2, and one for the object-side surface of the double-convex lens in the third lens group G3. For zooming the wide-angle end to the telephoto end of the zoom lens system, the first lens group G1 moves from the object side toward the image plane side, and then goes back slightly to the object side, as indicated by arrows. The second lens group G2 moves from the image plane side to the object side. The third lens group G3 remains fixed.

Figure 10:
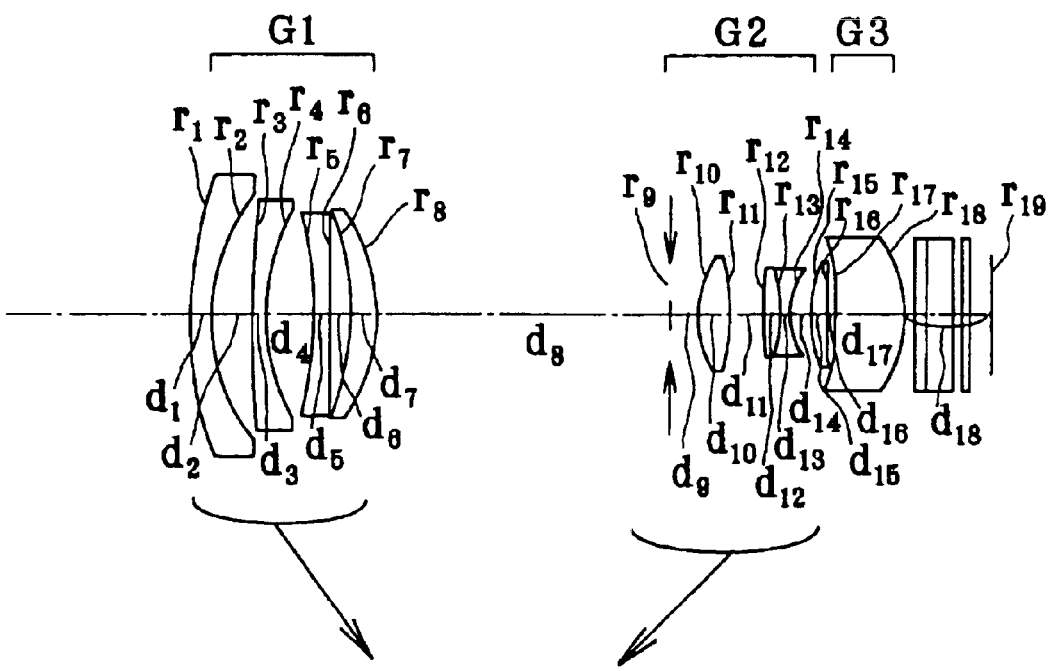
FIG. 10 shows in section Example 10 of the zoom lens system according to the present invention at its wide-angle end.

Example 10 is directed to a zoom lens system having a focal length of 1.975 to 5.703 mm, an F-number of 2.32 to 4.00, a half field angle of 38.1 to 13.9° and an image height of 1.5 mm. As shown in FIG. 10, the first lens group G1 is made up of two negative meniscus lenses each convex on an object side thereof, a negative meniscus lens convex on an image plane side thereof and a positive meniscus lens convex on an image plane side thereof. The second lens group G2 is made up of a stop located on an object side thereof, a double-convex lens, a cemented lens consisting of a double-convex lens and a double-concave lens and a positive meniscus lens convex on an object side thereof, and the third lens group G3 is made up of one double-convex lens. Three aspherical surfaces are used; one for the surface located nearest to object side in the second lens group G2, one for the object-side surface of the cemented lens in the second lens group G2, and one for the object-side surface of the double-convex lens in the third lens group G3. For zooming the wide-angle end to the telephoto end of the zoom lens system, the first lens group G1 moves from the object side toward the image plane side, and then goes back slightly to the object side, as indicated by arrows. The second lens group G2 moves from the image plane side to the object side. The third lens group G3 remains fixed.

Figure 11:
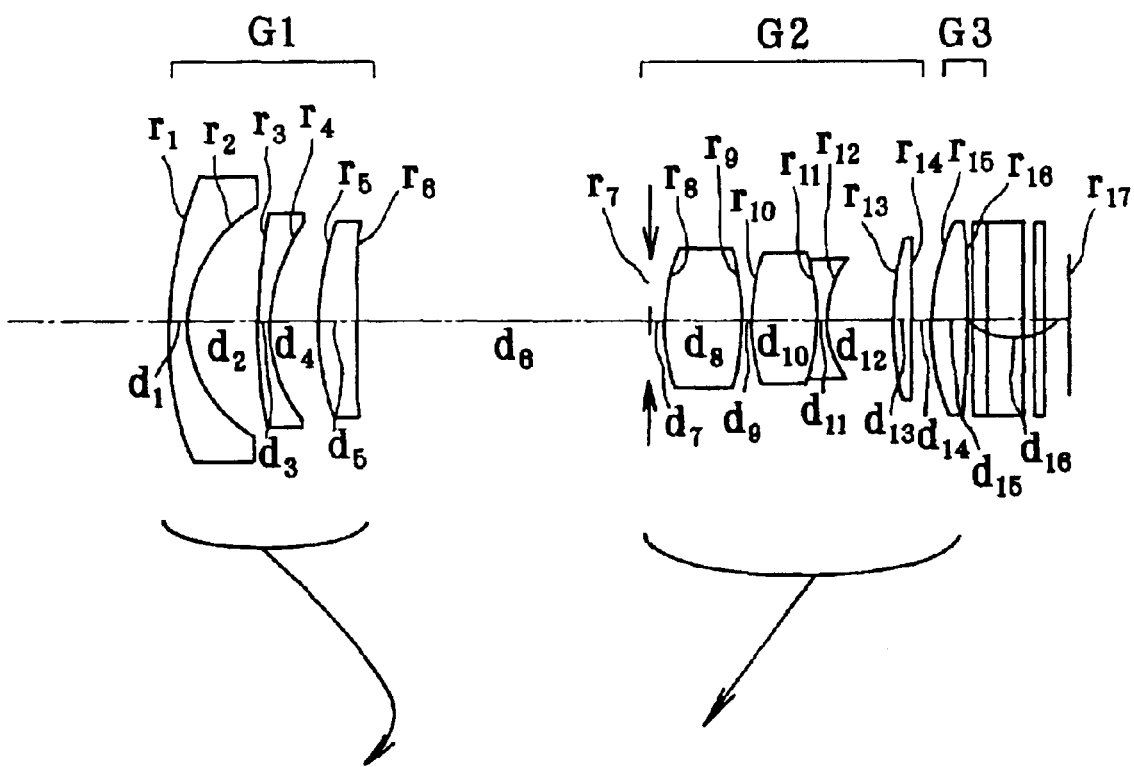
FIG. 11 shows in section Example 11 of the zoom lens system according to the present invention at its wide-angle end.

Example 11 is directed to a zoom lens system having a focal length of 2.635 to 7.620 mm, an F-number of 2.31 to 4.00, a half field angle of 37.9 to 15.8° and an image height of 2.0 mm. As shown in FIG. 11, the first lens group G1 is made up of two negative meniscus lenses each convex on an object side thereof, and a positive meniscus lens convex on an object side thereof. The second lens group G2 is made up of a stop located on an object side thereof, a double-convex lens, a cemented lens consisting of a double-convex lens and a double-concave lens and a positive meniscus lens convex on an object side thereof, and the third lens group G3 is made up of one double-convex lens. Three aspherical surfaces are used; one for the image plane-side surface of the second negative meniscus lens in the second lens group G1, one for the surface located to the object side in the second lens group G2, and one for the object-side surface of the double-convex lens in the third lens group G3. For zooming the wide-angle end to the telephoto end of the zoom lens system, the first lens group G1 moves from the object side toward the image plane side, and then goes back slightly to the object side, as indicated by arrows. The second lens group G2 moves from the image plane side to the object side. The third lens group G3 remains fixed.

Set out below are the numerical data on each example. The symbols used hereinafter but not hereinbefore have the following meanings:

f is the focal length of the zoom lens system, $F_{NO}$ is an F-number, ω is a half field angle, $r_1, r_2, \ldots$ are the radii of curvature of the respective lens surface, $d_1, d_2, \ldots$ are the spacings between adjacent lens surfaces, $n_{d1}, n_{d2}, \ldots$ the d-line refractive index of the respective lens surfaces, and $\nu_{d1}, \nu_{d2}, \ldots$ the d-line Abbe's numbers of the respective lenses. Here let x represent an optical axis provided that the direction of propagation of light is positive and y represent a direction perpendicular to the optical axis. Then, the shape of an aspherical surface is given by $$x=(y^2/r)/[1+\{1-(K+1)(y/r)^2\}^{1/2}]+A_4y^4+A_6y^6+A_8y^8+A_{10}y^{10}$$

where r is a paraxial radius of curvature, K is a conical coefficient, and $A_4, A_6, A_8$ and $A_{10}$ are the fourth, sixth, eighth and tenth aspherical coefficients, respectively.

EXAMPLE 1 f = 4.386 ~ 7.451 ~ 12.642
$F_{NO}$ = 2.36 ~ 2.96 ~ 3.99
ω = 37.9° ~ 23.7° ~ 14.4°

| | | | |
|---|---|---|---|
| $r_1$ = 30.608 | $d_1$ = 1.10 | $n_{d1}$ = 1.69680 | $\nu_{d1}$ = 55.53 |
| $r_2$ = 9.922 | $d_2$ = 2.42 | | |
| $r_3$ = 27.009 | $d_3$ = 0.95 | $n_{d2}$ = 1.78590 | $\nu_{d2}$ = 44.20 |
| $r_4$ = 8.504 | $d_4$ = 0.10 | $n_{d3}$ = 1.52555 | $\nu_{d3}$ = 52.45 |
| $r_5$ = 6.982 (Aspheric) | $d_5$ = 2.73 | | |
| $r_6$ = 12.311 | $d_6$ = 2.23 | $n_{d4}$ = 1.80518 | $\nu_{d4}$ = 25.42 |
| $r_7$ = 32.087 | $d_7$ = (Variable) | | |
| $r_8$ = ∞ (Stop) | $d_8$ = 0.94 | | |
| $r_9$ = 30.723 (Aspheric) | $d_9$ = 1.60 | $n_{d5}$ = 1.60311 | $\nu_{d5}$ = 60.64 |
| $r_{10}$ = −12.949 | $d_{10}$ = 0.50 | | |
| $r_{11}$ = 5.242 | $d_{11}$ = 3.55 | $n_{d6}$ = 1.61272 | $\nu_{d6}$ = 58.72 |
| $r_{12}$ = −89.064 | $d_{12}$ = 0.50 | $n_{d7}$ = 1.74077 | $\nu_{d7}$ = 27.79 |
| $r_{13}$ = 3.847 | $d_{13}$ = 2.19 | | |
| $r_{14}$ = −20.881 | $d_{14}$ = 1.37 | $n_{d8}$ = 1.51633 | $\nu_{d8}$ = 64.14 |
| $r_{15}$ = −9.365 | $d_{15}$ = (Variable) | | |
| $r_{16}$ = 39.137 (Aspheric) | $d_{16}$ = 2.46 | $n_{d9}$ = 1.56384 | $\nu_{d9}$ = 60.67 |
| $r_{17}$ = −9.532 | $d_{17}$ = 4.20 | | |
| $r_{18}$ = ∞ (Image Plane) | | | |

Zooming Spaces

| f | 4.386 | 7.451 | 12.642 |
|---|---|---|---|
| $d_7$ | 17.15 | 6.98 | 1.00 |
| $d_{15}$ | 1.00 | 5.01 | 11.77 |

Aspherical Coefficients

5th surface

K = 0.000
$A_4$ = −4.37407 × $10^{-4}$
$A_6$ = 2.95376 × $10^{-10}$
$A_8$ = −1.05245 × $10^{-7}$
$A_{10}$ = −2.15246 × $10^{-9}$

9th surface

K = 0.000
$A_4$ = −2.05174 × $10^{-4}$
$A_6$ = −6.60605 × $10^{-6}$
$A_8$ = 8.45958 × $10^{-7}$
$A_{10}$ = −3.81345 × $10^{-8}$

16th surface

K = 0.000
$A_4$ = −5.57767 × $10^{-4}$
$A_6$ = 1.64691 × $10^{-5}$
$A_8$ = −8.27513 × $10^{-7}$
$A_{10}$ = 1.69001 × $10^{-8}$

EXAMPLE 2 f = 4.375 ~ 7.411 ~ 12.649
$F_{NO}$ = 2.83 ~ 3.48 ~ 4.62
ω = 37.8° ~ 24.1° ~ 15.8°

| | | | |
|---|---|---|---|
| $r_1$ = 15.773 | $d_1$ = 1.10 | $n_{d1}$ = 1.69680 | $\nu_{d1}$ = 55.53 |
| $r_2$ = 9.476 | $d_2$ = 1.53 | | |
| $r_3$ = 14.021 | $d_3$ = 1.00 | $n_{d2}$ = 1.69680 | $\nu_{d2}$ = 55.53 |
| $r_4$ = 8.058 | $d_4$ = 2.59 | | |
| $r_5$ = 40.949 | $d_5$ = 0.80 | $n_{d3}$ = 1.88300 | $\nu_{d3}$ = 40.76 |
| $r_6$ = 7.484 (Aspheric) | $d_6$ = 2.33 | | |
| $r_7$ = 14.074 | $d_7$ = 2.21 | $n_{d4}$ = 1.80518 | $\nu_{d4}$ = 25.42 |
| $r_8$ = 315.362 | $d_8$ = (Variable) | | |
| $r_9$ = ∞ (Stop) | $d_9$ = 0.87 | | |
| $r_{10}$ = 8.943 (Aspheric) | $d_{10}$ = 2.80 | $n_{d5}$ = 1.60311 | $\nu_{d5}$ = 60.64 |
| $r_{11}$ = −19.486 | $d_{11}$ = 1.74 | | |
| $r_{12}$ = 11.249 | $d_{12}$ = 3.34 | $n_{d6}$ = 1.61272 | $\nu_{d6}$ = 58.72 |
| $r_{13}$ = −8.479 | $d_{13}$ = 0.50 | $n_{d7}$ = 1.74077 | $\nu_{d7}$ = 27.79 |

-continued $$f = 4.375 \sim 7.411 \sim 12.649$$
$$F_{NO} = 2.83 \sim 3.48 \sim 4.62$$
$$\omega = 37.8° \sim 24.1° \sim 15.8°$$

| | | | |
|---|---|---|---|
| $r_{14} = 5.482$ | $d_{14} = 3.17$ | | |
| $r_{15} = 15.126$ | $d_{15} = 2.29$ | $n_{d8} = 1.60342$ | $v_{d8} = 38.03$ |
| $r_{16} = -48.736$ | $d_{16} =$ (Variable) | | |
| $r_{17} = 12.445$ (Aspheric) | $d_{17} = 1.39$ | $n_{d9} = 1.56384$ | $v_{d9} = 60.67$ |
| $r_{18} = -250.472$ | $d_{18} = 4.21$ | | |
| $r_{19} = \infty$ (Image Plane) | | | |

Zooming Spaces

| f | 4.375 | 7.411 | 12.649 |
|---|---|---|---|
| $d_8$ | 16.57 | 6.83 | 1.00 |
| $d_{16}$ | 0.50 | 5.03 | 12.82 |

Aspherical Coefficients

6th surface $K = 0.000$
$A_4 = -3.68865 \times 10^{-4}$
$A_6 = -1.90729 \times 10^{-6}$
$A_8 = -9.53501 \times 10^{-8}$
$A_{10} = 8.24639 \times 10^{-12}$ 10th surface $K = 0.000$
$A_4 = -2.77414 \times 10^{-4}$
$A_6 = 2.77354 \times 10^{-6}$
$A_8 = -4.45517 \times 10^{-7}$
$A_{10} = 1.14044 \times 10^{-8}$ 17th surface $K = 0.000$
$A_4 = -2.92081 \times 10^{-4}$
$A_6 = 1.48703 \times 10^{-5}$
$A_8 = -6.56437 \times 10^{-7}$
$A_{10} = 1.02200 \times 10^{-8}$

EXAMPLE 3

$$f = 4.374 \sim 7.448 \sim 12.649$$
$$F_{NO} = 2.31 \sim 2.93 \sim 4.00$$
$$\omega = 37.9° \sim 24.0° \sim 15.8°$$

| | | | |
|---|---|---|---|
| $r_1 = 20.947$ | $d_1 = 0.95$ | $n_{d1} = 1.69680$ | $v_{d1} = 55.53$ |
| $r_2 = 6.794$ | $d_2 = 3.43$ | | |
| $r_3 = 25.746$ | $d_3 = 0.70$ | $n_{d2} = 1.78590$ | $v_{d2} = 44.20$ |
| $r_4 = 6.745$ (Aspheric) | $d_4 = 2.48$ | | |
| $r_5 = 13.847$ | $d_5 = 2.10$ | $n_{d3} = 1.80518$ | $v_{d3} = 25.42$ |
| $r_6 = 102.749$ | $d_6 =$ (Variable) | | |
| $r_7 = \infty$ (Stop) | $d_7 = 0.70$ | | |
| $r_8 = 8.691$ (Aspheric) | $d_8 = 3.92$ | $n_{d4} = 1.60311$ | $v_{d4} = 60.64$ |
| $r_9 = -18.462$ | $d_9 = 0.50$ | | |
| $r_{10} = 9.505$ | $d_{10} = 3.45$ | $n_{d5} = 1.61272$ | $v_{d5} = 58.72$ |
| $r_{11} = -10.051$ | $d_{11} = 0.50$ | $n_{d6} = 1.74077$ | $v_{d6} = 27.79$ |
| $r_{12} = 4.905$ | $d_{12} = 3.42$ | | |
| $r_{13} = 15.706$ | $d_{13} = 1.01$ | $n_{d7} = 1.60342$ | $v_{d7} = 38.03$ |
| $r_{14} = 17250.422$ | $d_{14} =$ (Variable) | | |
| $r_{15} = 11.303$ (Aspheric) | $d_{15} = 1.78$ | $n_{d8} = 1.56384$ | $v_{d8} = 60.67$ |
| $r_{16} = -48.249$ | $d_{16} = 3.94$ | | |
| $r_{17} = \infty$ (Image Plane) | | | |

Zooming Spaces

| f | 4.374 | 7.448 | 12.649 |
|---|---|---|---|
| $d_6$ | 15.02 | 6.19 | 1.00 |
| $d_{14}$ | 1.00 | 5.80 | 13.87 |

-continued $$f = 4.374 \sim 7.448 \sim 12.649$$
$$F_{NO} = 2.31 \sim 2.93 \sim 4.00$$
$$\omega = 37.9° \sim 24.0° \sim 15.8°$$

Aspherical Coefficients

4th surface $K = 0.000$
$A_4 = -5.75781 \times 10^{-4}$
$A_6 = -2.01153 \times 10^{-6}$
$A_8 = -2.60007 \times 10^{-7}$
$A_{10} = -3.72946 \times 10^{-10}$ 8th surface $K = 0.000$
$A_4 = -2.80524 \times 10^{-4}$
$A_6 = -1.61468 \times 10^{-6}$
$A_8 = -1.94898 \times 10^{-8}$
$A_{10} = -1.27601 \times 10^{-10}$ 15th surface $K = 0.000$
$A_4 = -2.70433 \times 10^{-4}$
$A_6 = 1.36913 \times 10^{-5}$
$A_8 = -6.86548 \times 10^{-7}$
$A_{10} = 1.27612 \times 10^{-8}$

EXAMPLE 4

$$f = 4.374 \sim 7.448 \sim 12.648$$
$$F_{NO} = 2.31 \sim 2.93 \sim 4.00$$
$$\omega = 38.0° \sim 23.8° \sim 15.6°$$

| | | | |
|---|---|---|---|
| $r_1 = 73.199$ | $d_1 = 1.10$ | $n_{d1} = 1.69680$ | $v_{d1} = 55.53$ |
| $r_2 = 13.721$ (Aspheric) | $d_2 = 3.98$ | | |
| $r_3 = -1281.699$ | $d_3 = 0.95$ | $n_{d2} = 1.81600$ | $v_{d2} = 46.62$ |
| $r_4 = 8.202$ | $d_4 = 3.12$ | | |
| $r_5 = 14.786$ | $d_5 = 2.05$ | $n_{d3} = 1.80518$ | $v_{d3} = 25.42$ |
| $r_6 = 88.390$ | $d_6 =$ (Variable) | | |
| $r_7 = \infty$ (Stop) | $d_7 = 0.42$ | | |
| $r_8 = 23.686$ (Aspheric) | $d_8 = 1.66$ | $n_{d4} = 1.60311$ | $v_{d4} = 60.64$ |
| $r_9 = -16.220$ | $d_9 = 0.50$ | | |
| $r_{10} = 6.386$ | $d_{10} = 4.62$ | $n_{d5} = 1.61272$ | $v_{d5} = 58.72$ |
| $r_{11} = -13.321$ | $d_{11} = 0.50$ | $n_{d6} = 1.72825$ | $v_{d6} = 28.46$ |
| $r_{12} = 4.469$ | $d_{12} = 2.75$ | | |
| $r_{13} = 46.980$ | $d_{13} = 1.64$ | $n_{d7} = 1.51633$ | $v_{d7} = 64.14$ |
| $r_{14} = -18.186$ | $d_{14} =$ (Variable) | | |
| $r_{15} = 19.128$ (Aspheric) | $d_{15} = 2.30$ | $n_{d8} = 1.56384$ | $v_{d8} = 60.67$ |
| $r_{16} = -14.925$ | $d_{16} = 4.19$ | | |
| $r_{17} = \infty$ (Image Plane) | | | |

Zooming Spaces

| f | 4.374 | 7.448 | 12.648 |
|---|---|---|---|
| $d_6$ | 16.12 | 6.58 | 1.00 |
| $d_{14}$ | 1.00 | 5.73 | 13.69 |

Aspherical Coefficients

2nd surface $K = 0.000$
$A_4 = -1.83153 \times 10^{-4}$
$A_6 = -3.40705 \times 10^{-7}$
$A_8 = 1.25210 \times 10^{-13}$
$A_{10} = -9.97522 \times 10^{-12}$ 8th surface $K = 0.000$
$A_4 = -1.00639 \times 10^{-4}$
$A_6 = -1.18430 \times 10^{-6}$
$A_8 = 2.11991 \times 10^{-7}$ -continued $$f = 4.374 \sim 7.448 \sim 12.648$$
$$F_{NO} = 2.31 \sim 2.93 \sim 4.00$$
$$\omega = 38.0° \sim 23.8° \sim 15.6°$$

$A_{10} = -9.90194 \times 10^{-9}$

15th surface $K = 0.000$
$A_4 = -4.01115 \times 10^{-4}$
$A_6 = 1.35678 \times 10^{-5}$
$A_8 = -6.19449 \times 10^{-7}$
$A_{10} = 1.00098 \times 10^{-8}$

EXAMPLE 5

$$f = 4.387 \sim 7.451 \sim 12.643$$
$$F_{NO} = 2.42 \sim 3.04 \sim 4.09$$
$$\omega = 37.9° \sim 24.2° \sim 14.9°$$

| | | | |
|---|---|---|---|
| $r_1 = 20.677$ | $d_1 = 1.10$ | $n_{d1} = 1.69680$ | $\nu_{d1} = 55.53$ |
| $r_2 = 8.565$ | $d_2 = 3.49$ | | |
| $r_3 = 37.351$ | $d_3 = 0.95$ | $n_{d2} = 1.81600$ | $\nu_{d2} = 46.62$ |
| $r_4 = 9.087$ | $d_4 = 0.10$ | $n_{d3} = 1.52555$ | $\nu_{d3} = 52.45$ |
| $r_5 = 7.102$ (Aspheric) | $d_5 = 3.09$ | | |
| $r_6 = 15.013$ | $d_6 = 2.20$ | $n_{d4} = 1.80518$ | $\nu_{d4} = 25.42$ |
| $r_7 = 78.101$ | $d_7$ = (Variable) | | |
| $r_8 = \infty$ (Stop) | $d_8 = 0.96$ | | |
| $r_9 = 192.084$ (Aspheric) | $d_9 = 1.47$ | $n_{d5} = 1.60311$ | $\nu_{d5} = 60.64$ |
| $r_{10} = -12.882$ | $d_{10} = 0.50$ | | |
| $r_{11} = 6.097$ | $d_{11} = 5.24$ | $n_{d6} = 1.61272$ | $\nu_{d6} = 58.72$ |
| $r_{12} = -9.764$ | $d_{12} = 0.50$ | $n_{d7} = 1.74077$ | $\nu_{d7} = 27.79$ |
| $r_{13} = 4.498$ | $d_{13} = 2.15$ | | |
| $r_{14} = -58.594$ | $d_{14} = 1.47$ | $n_{d8} = 1.60342$ | $\nu_{d8} = 38.03$ |
| $r_{15} = -11.441$ | $d_{15}$ = (Variable) | | |
| $r_{16} = 14.316$ | $d_{16} = 2.75$ | $n_{d9} = 1.56384$ | $\nu_{d9} = 60.67$ |
| $r_{17} = -18.860$ | $d_{17} = 4.20$ | | |
| $r_{18} = \infty$ (Image Plane) | | | |

Zooming Spaces

| f | 4.387 | 7.451 | 12.643 |
|---|---|---|---|
| $d_7$ | 17.82 | 7.23 | 1.00 |
| $d_{15}$ | 1.00 | 5.63 | 13.44 |

Aspherical Coefficients

5th surface $K = 0.000$
$A_4 = -5.06617 \times 10^{-4}$
$A_6 = 2.08894 \times 10^{-10}$
$A_8 = -1.83217 \times 10^{-7}$
$A_{10} = -2.12210 \times 10^{-10}$ 9th surface $K = 0.000$
$A_4 = -1.20398 \times 10^{-4}$
$A_6 = -4.22111 \times 10^{-6}$
$A_8 = 5.21447 \times 10^{-7}$
$A_{10} = -1.71674 \times 10^{-8}$

EXAMPLE 6

$$f = 4.371 \sim 4.898 \sim 12.622$$
$$F_{NO} = 2.32 \sim 2.42 \sim 4.00$$
$$\omega = 38.1° \sim 24.8° \sim 13.9°$$

| | | | |
|---|---|---|---|
| $r_1 = 26.445$ | $d_1 = 1.10$ | $n_{d1} = 1.69680$ | $\nu_{d1} = 55.53$ |
| $r_2 = 11.792$ | $d_2 = 2.81$ | | |
| $r_3 = 68.200$ | $d_3 = 1.00$ | $n_{d2} = 1.69680$ | $\nu_{d2} = 55.53$ |
| $r_4 = 14.028$ | $d_4 = 3.16$ | | |

-continued $$f = 4.371 \sim 4.898 \sim 12.622$$
$$F_{NO} = 2.32 \sim 2.42 \sim 4.00$$
$$\omega = 38.1° \sim 24.8° \sim 13.9°$$

| | | | |
|---|---|---|---|
| $r_5 = -23.225$ | $d_5 = 0.90$ | $n_{d3} = 1.88300$ | $\nu_{d3} = 40.76$ |
| $r_6 = -4325.882$ | $d_6 = 1.34$ | | |
| $r_7 = -20.775$ | $d_7 = 1.72$ | $n_{d4} = 1.80518$ | $\nu_{d4} = 25.42$ |
| $r_8 = -11.656$ | $d_8$ = (Variable) | | |
| $r_9 = \infty$ (Stop) | $d_9 = 1.70$ | | |
| $r_{10} = 6.001$ (Aspheric) | $d_{10} = 2.03$ | $n_{d5} = 1.60311$ | $\nu_{d5} = 60.64$ |
| $r_{11} = -18.104$ | $d_{11} = 2.19$ | | |
| $r_{12} = 132.728$ (Aspheric) | $d_{12} = 1.01$ | $n_{d6} = 1.61272$ | $\nu_{d6} = 58.72$ |
| $r_{13} = -11.240$ | $d_{13} = 0.50$ | $n_{d7} = 1.74077$ | $\nu_{d7} = 27.79$ |
| $r_{14} = 4.411$ | $d_{14} = 1.28$ | | |
| $r_{15} = 7.374$ | $d_{15} = 1.11$ | $n_{d8} = 1.60342$ | $\nu_{d8} = 38.03$ |
| $r_{16} = 53.534$ | $d_{16}$ = (Variable) | | |
| $r_{17} = 88.907$ (Aspheric) | $d_{17} = 4.56$ | $n_{d9} = 1.56384$ | $\nu_{d9} = 60.67$ |
| $r_{18} = -8.781$ | $d_{18} = 4.35$ | | |
| $r_{19} = \infty$ (Image Plane) | | | |

Zooming Spaces

| f | 4.371 | 4.898 | 12.622 |
|---|---|---|---|
| $d_8$ | 18.99 | 15.85 | 1.00 |
| $d_{16}$ | 0.50 | 1.25 | 11.73 |

Aspherical Coefficients

10th surface $K = 0.000$
$A_4 = -6.37232 \times 10^{-4}$
$A_6 = -4.39285 \times 10^{-6}$
$A_8 = -1.16573 \times 10^{-6}$
$A_{10} = 3.24269 \times 10^{-8}$ 12th surface $K = 0.000$
$A_4 = 3.49239 \times 10^{-4}$
$A_6 = -1.39146 \times 10^{-5}$
$A_8 = 3.75806 \times 10^{-6}$
$A_{10} = 5.39048 \times 10^{-9}$ 17th surface $K = 0.000$
$A_4 = -1.22514 \times 10^{-3}$
$A_6 = -1.04830 \times 10^{-5}$
$A_8 = -6.78577 \times 10^{-7}$
$A_{10} = 4.26779 \times 10^{-8}$

EXAMPLE 7

$$f = 2.973 \sim 5.050 \sim 8.568$$
$$F_{NO} = 2.42 \sim 3.04 \sim 4.09$$
$$\omega = 37.9° \sim 23.7° \sim 14.4°$$

| | | | |
|---|---|---|---|
| $r_1 = 14.013$ | $d_1 = 0.75$ | $n_{d1} = 1.69680$ | $\nu_{d1} = 55.53$ |
| $r_2 = 5.805$ | $d_2 = 2.36$ | | |
| $r_3 = 25.313$ | $d_3 = 0.64$ | $n_{d2} = 1.81600$ | $\nu_{d2} = 46.62$ |
| $r_4 = 6.158$ | $d_4 = 0.07$ | $n_{d3} = 1.52555$ | $\nu_{d3} = 52.45$ |
| $r_5 = 4.813$ (Aspheric) | $d_5 = 2.10$ | | |
| $r_6 = 10.175$ | $d_6 = 1.49$ | $n_{d4} = 1.80518$ | $\nu_{d4} = 25.42$ |
| $r_7 = 52.930$ | $d_7$ = (Variable) | | |
| $r_8 = \infty$ (Stop) | $d_8 = 0.65$ | | |
| $r_9 = 130.178$ (Aspheric) | $d_9 = 1.00$ | $n_{d5} = 1.60311$ | $\nu_{d5} = 60.64$ |
| $r_{10} = -8.730$ | $d_{10} = 0.34$ | | |
| $r_{11} = 4.132$ | $d_{11} = 3.55$ | $n_{d6} = 1.61272$ | $\nu_{d6} = 58.72$ |
| $r_{12} = -6.617$ | $d_{12} = 0.34$ | $n_{d7} = 1.74077$ | $\nu_{d7} = 27.79$ |
| $r_{13} = 3.048$ | $d_{13} = 1.46$ | | |
| $r_{14} = -39.710$ | $d_{14} = 0.99$ | $n_{d8} = 1.60342$ | $\nu_{d8} = 38.03$ |
| $r_{15} = -7.754$ | $d_{15}$ = (Variable) | | |

-continued $$f = 2.973 \sim 5.050 \sim 8.568$$
$$F_{NO} = 2.42 \sim 3.04 \sim 4.09$$
$$\omega = 37.9° \sim 23.7° \sim 14.4°$$

| | | | |
|---|---|---|---|
| $r_{16} = 9.702$ | $d_{16} = 1.86$ | $n_{d9} = 1.56384$ | $\nu_{d9} = 60.67$ |
| $r_{17} = -12.781$ | $d_{17} = 2.85$ | | |
| $r_{18} = \infty$ (Image Plane) | | | |

Zooming Spaces

| f | 2.973 | 5.050 | 8.568 |
|---|---|---|---|
| $d_7$ | 12.07 | 4.90 | 0.68 |
| $d_{15}$ | 0.68 | 3.82 | 9.11 |

Aspherical Coefficients

5th surface $K = 0.000$
$A_4 = -1.62760 \times 10^{-3}$
$A_6 = 1.46118 \times 10^{-9}$
$A_8 = -2.79032 \times 10^{-6}$
$A_{10} = -7.03666 \times 10^{-9}$ 9th surface $K = 0.000$
$A_4 = -3.86799 \times 10^{-4}$
$A_6 = -2.95260 \times 10^{-5}$
$A_8 = 7.94144 \times 10^{-6}$
$A_{10} = -5.69253 \times 10^{-7}$

EXAMPLE 8

$$f = 3.293 \sim 5.609 \sim 9.524$$
$$F_{NO} = 2.31 \sim 2.93 \sim 4.00$$
$$\omega = 38.0° \sim 23.8° \sim 15.6°$$

| | | | |
|---|---|---|---|
| $r_1 = 55.120$ | $d_1 = 0.83$ | $n_{d1} = 1.69680$ | $\nu_{d1} = 55.53$ |
| $r_2 = 10.332$ (Aspheric) | $d_2 = 3.00$ | | |
| $r_3 = -965.135$ | $d_3 = 0.72$ | $n_{d2} = 1.81600$ | $\nu_{d2} = 46.62$ |
| $r_4 = 6.176$ | $d_4 = 2.35$ | | |
| $r_5 = 11.134$ | $d_5 = 1.54$ | $n_{d3} = 1.80518$ | $\nu_{d3} = 25.42$ |
| $r_6 = 66.559$ | $d_6 =$ (Variable) | | |
| $r_7 = \infty$ (Stop) | $d_7 = 0.31$ | | |
| $r_8 = 17.836$ (Aspheric) | $d_8 = 1.25$ | $n_{d4} = 1.60311$ | $\nu_{d4} = 60.64$ |
| $r_9 = -12.214$ | $d_9 = 0.38$ | | |
| $r_{10} = 4.809$ | $d_{10} = 3.48$ | $n_{d5} = 1.61272$ | $\nu_{d5} = 58.72$ |
| $r_{11} = -10.031$ | $d_{11} = 0.38$ | $n_{d6} = 1.72825$ | $\nu_{d6} = 28.46$ |
| $r_{12} = 3.365$ | $d_{12} = 2.07$ | | |
| $r_{13} = 35.376$ | $d_{13} = 1.24$ | $n_{d7} = 1.51633$ | $\nu_{d7} = 64.14$ |
| $r_{14} = -13.694$ | $d_{14} =$ (Variable) | | |
| $r_{15} = 14.404$ (Aspheric) | $d_{15} = 1.73$ | $n_{d8} = 1.56384$ | $\nu_{d8} = 60.67$ |
| $r_{16} = -11.239$ | $d_{16} = 3.16$ | | |
| $r_{17} = \infty$ (Image Plane) | | | |

Zooming Spaces

| f | 3.293 | 5.609 | 9.524 |
|---|---|---|---|
| $d_6$ | 12.14 | 4.96 | 0.75 |
| $d_{14}$ | 0.75 | 4.32 | 10.31 |

Aspherical Coefficients

2nd surface $K = 0.000$
$A_4 = -4.28951 \times 10^{-4}$
$A_6 = -1.40724 \times 10^{-6}$
$A_8 = 9.12064 \times 10^{-13}$
$A_{10} = -1.28146 \times 10^{-10}$ 8th surface $K = 0.000$
$A_4 = -2.35699 \times 10^{-4}$ -continued $$f = 3.293 \sim 5.609 \sim 9.524$$
$$F_{NO} = 2.31 \sim 2.93 \sim 4.00$$
$$\omega = 38.0° \sim 23.8° \sim 15.6°$$

$A_6 = -4.89159 \times 10^{-6}$
$A_8 = 1.54420 \times 10^{-6}$
$A_{10} = -1.27205 \times 10^{-7}$ 15th surface $K = 0.000$
$A_4 = -9.39428 \times 10^{-4}$
$A_6 = 5.60401 \times 10^{-5}$
$A_8 = -4.51224 \times 10^{-6}$
$A_{10} = 1.28590 \times 10^{-7}$

EXAMPLE 9

$$f = 2.378 \sim 4.040 \sim 6.854$$
$$F_{NO} = 2.36 \sim 2.96 \sim 3.99$$
$$\omega = 37.9° \sim 23.7° \sim 14.4°$$

| | | | |
|---|---|---|---|
| $r_1 = 16.595$ | $d_1 = 0.60$ | $n_{d1} = 1.69680$ | $\nu_{d1} = 55.53$ |
| $r_2 = 5.379$ | $d_2 = 1.31$ | | |
| $r_3 = 14.644$ | $d_3 = 0.52$ | $n_{d2} = 1.78590$ | $\nu_{d2} = 44.20$ |
| $r_4 = 4.611$ | $d_4 = 0.05$ | $n_{d3} = 1.52555$ | $\nu_{d3} = 52.45$ |
| $r_5 = 3.785$ (Aspheric) | $d_5 = 1.48$ | | |
| $r_6 = 6.675$ | $d_6 = 1.21$ | $n_{d4} = 1.80518$ | $\nu_{d4} = 25.42$ |
| $r_7 = 17.397$ | $d_7 =$ (Variable) | | |
| $r_8 = \infty$ (Stop) | $d_8 = 0.51$ | | |
| $r_9 = 16.657$ (Aspheric) | $d_9 = 0.87$ | $n_{d5} = 1.60311$ | $\nu_{d5} = 60.64$ |
| $r_{10} = -7.020$ | $d_{10} = 0.27$ | | |
| $r_{11} = 2.842$ | $d_{11} = 1.93$ | $n_{d6} = 1.61272$ | $\nu_{d6} = 58.72$ |
| $r_{12} = -48.288$ | $d_{12} = 0.27$ | $n_{d7} = 1.74077$ | $\nu_{d7} = 27.79$ |
| $r_{13} = 2.086$ | $d_{13} = 1.19$ | | |
| $r_{14} = -11.321$ | $d_{14} = 0.74$ | $n_{d8} = 1.51633$ | $\nu_{d8} = 64.14$ |
| $r_{15} = -5.077$ | $d_{15} =$ (Variable) | | |
| $r_{16} = 21.219$ (Aspheric) | $d_{16} = 1.34$ | $n_{d9} = 1.56384$ | $\nu_{d9} = 60.67$ |
| $r_{17} = -5.168$ | $d_{17} = 2.28$ | | |
| $r_{18} = \infty$ (Image Plane) | | | |

Zooming Spaces

| f | 2.378 | 4.040 | 6.854 |
|---|---|---|---|
| $d_7$ | 9.30 | 3.79 | 0.54 |
| $d_{15}$ | 0.54 | 2.72 | 6.38 |

Aspherical Coefficients

5th surface $K = 0.000$
$A_4 = -2.74462 \times 10^{-3}$
$A_6 = 6.30526 \times 10^{-9}$
$A_8 = -7.64294 \times 10^{-6}$
$A_{10} = -5.31771 \times 10^{-7}$ 9th surface $K = 0.000$
$A_4 = -1.28741 \times 10^{-3}$
$A_6 = -1.41016 \times 10^{-4}$
$A_8 = 6.14338 \times 10^{-5}$
$A_{10} = -9.42124 \times 10^{-6}$ 16th surface $K = 0.000$
$A_4 = -3.49985 \times 10^{-3}$
$A_6 = 3.51560 \times 10^{-4}$
$A_8 = -6.00944 \times 10^{-5}$
$A_{10} = 4.17522 \times 10^{-6}$

EXAMPLE 10

$f = 1.975 \sim 2.213 \sim 5.703$
$F_{NO} = 2.32 \sim 2.42 \sim 4.00$
$\omega = 38.1° \sim 24.8° \sim 13.9°$

| | | | |
|---|---|---|---|
| $r_1 = 11.948$ | $d_1 = 0.50$ | $n_{d1} = 1.69680$ | $\nu_{d1} = 55.53$ |
| $r_2 = 5.328$ | $d_2 = 1.27$ | | |
| $r_3 = 30.813$ | $d_3 = 0.45$ | $n_{d2} = 1.69680$ | $\nu_{d2} = 55.53$ |
| $r_4 = 6.338$ | $d_4 = 1.43$ | | |
| $r_5 = -10.493$ | $d_5 = 0.41$ | $n_{d3} = 1.88300$ | $\nu_{d3} = 40.76$ |
| $r_6 = -1954.465$ | $d_6 = 0.60$ | | |
| $r_7 = -9.386$ | $d_7 = 0.78$ | $n_{d4} = 1.80518$ | $\nu_{d4} = 25.42$ |
| $r_8 = -5.266$ | $d_8 =$ (Variable) | | |
| $r_9 = \infty$ (Stop) | $d_9 = 0.77$ | | |
| $r_{10} = 2.711$ (Aspheric) | $d_{10} = 0.92$ | $n_{d5} = 1.60311$ | $\nu_{d5} = 60.64$ |
| $r_{11} = -8.179$ | $d_{11} = 0.99$ | | |
| $r_{12} = 59.968$ (Aspheric) | $d_{12} = 0.46$ | $n_{d6} = 1.61272$ | $\nu_{d6} = 58.72$ |
| $r_{13} = -5.078$ | $d_{13} = 0.23$ | $n_{d7} = 1.74077$ | $\nu_{d7} = 27.79$ |
| $r_{14} = 1.993$ | $d_{14} = 0.58$ | | |
| $r_{15} = 3.332$ | $d_{15} = 0.50$ | $n_{d8} = 1.60342$ | $\nu_{d8} = 38.03$ |
| $r_{16} = 24.187$ | $d_{16} =$ (Variable) | | |
| $r_{17} = 40.169$ (Aspheric) | $d_{17} = 2.06$ | $n_{d9} = 1.56384$ | $\nu_{d9} = 60.67$ |
| $r_{18} = -3.967$ | $d_{18} = 2.52$ | | |
| $r_{19} = \infty$ (Image Plane) | | | |

Zooming Spaces

| f | 1.975 | 2.213 | 5.703 |
|---|---|---|---|
| $d_8$ | 8.58 | 7.16 | 0.45 |
| $d_{16}$ | 0.23 | 0.57 | 5.30 |

Aspherical Coefficients

10th surface $K = 0.000$
$A_4 = -6.90936 \times 10^{-3}$
$A_6 = -2.33335 \times 10^{-4}$
$A_8 = -3.03337 \times 10^{-4}$
$A_{10} = 4.13358 \times 10^{-5}$ 12th surface $K = 0.000$
$A_4 = 3.78672 \times 10^{-3}$
$A_6 = -7.39104 \times 10^{-4}$
$A_8 = 9.77894 \times 10^{-4}$
$A_{10} = 6.87146 \times 10^{-6}$ 17th surface $K = 0.000$
$A_4 = -1.32840 \times 10^{-2}$
$A_6 = -5.56828 \times 10^{-4}$
$A_8 = -1.76574 \times 10^{-4}$
$A_{10} = 5.44032 \times 10^{-5}$

EXAMPLE 11

$f = 2.635 \sim 4.487 \sim 7.620$
$F_{NO} = 2.31 \sim 2.93 \sim 4.00$
$\omega = 37.9° \sim 24.0° \sim 15.8°$

| | | | |
|---|---|---|---|
| $r_1 = 12.619$ | $d_1 = 0.57$ | $n_{d1} = 1.69680$ | $\nu_{d1} = 55.53$ |
| $r_2 = 4.093$ | $d_2 = 2.07$ | | |
| $r_3 = 15.510$ | $d_3 = 0.42$ | $n_{d2} = 1.78590$ | $\nu_{d2} = 44.20$ |
| $r_4 = 4.063$ (Aspheric) | $d_4 = 1.50$ | | |
| $r_5 = 8.342$ | $d_5 = 1.27$ | $n_{d3} = 1.80518$ | $\nu_{d3} = 25.42$ |
| $r_6 = 61.897$ | $d_6 =$ (Variable) | | |
| $r_7 = \infty$ (Stop) | $d_7 = 0.42$ | | |
| $r_8 = 5.236$ (Aspheric) | $d_8 = 2.36$ | $n_{d4} = 1.60311$ | $\nu_{d4} = 60.64$ |
| $r_9 = -11.121$ | $d_9 = 0.30$ | | |
| $r_{10} = 5.726$ | $d_{10} = 2.08$ | $n_{d5} = 1.61272$ | $\nu_{d5} = 58.72$ |
| $r_{11} = -6.055$ | $d_{11} = 0.30$ | $n_{d6} = 1.74077$ | $\nu_{d6} = 27.79$ |
| $r_{12} = 2.955$ | $d_{12} = 2.06$ | | |
| $r_{13} = 9.461$ | $d_{13} = 0.61$ | $n_{d7} = 1.60342$ | $\nu_{d7} = 38.03$ |
| $r_{14} = 10391.820$ | $d_{14} =$ (Variable) | | |
| $r_{15} = 6.809$ (Aspheric) | $d_{15} = 1.07$ | $n_{d8} = 1.56384$ | $\nu_{d8} = 60.67$ |
| $r_{16} = -29.066$ | $d_{16} = 2.38$ | | |
| $r_{17} = \infty$ (Image Plane) | | | |

Zooming Spaces

| f | 2.635 | 4.487 | 7.620 |
|---|---|---|---|
| $d_6$ | 9.05 | 3.73 | 0.60 |
| $d_{14}$ | 0.60 | 3.50 | 8.36 |

Aspherical Coefficients

Figure 12A:
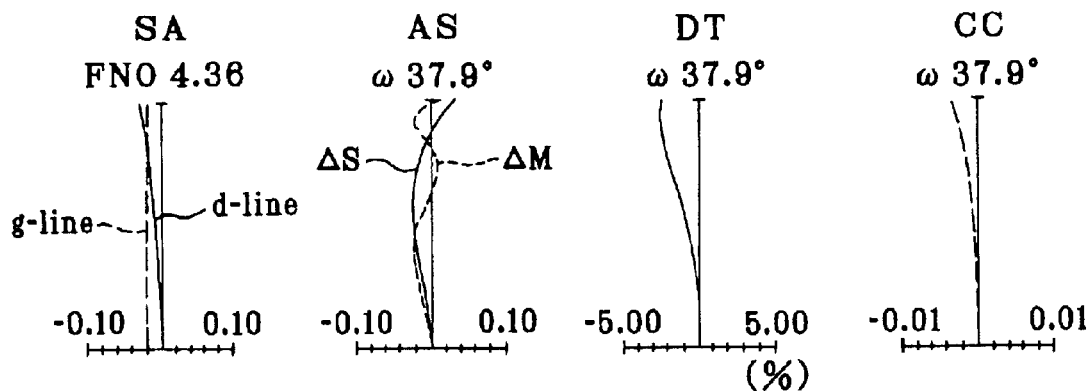
FIGS. 12(a), 12(b) and 12(c) are aberration diagrams for Example 1 upon focused at infinity.
Figure 12B:
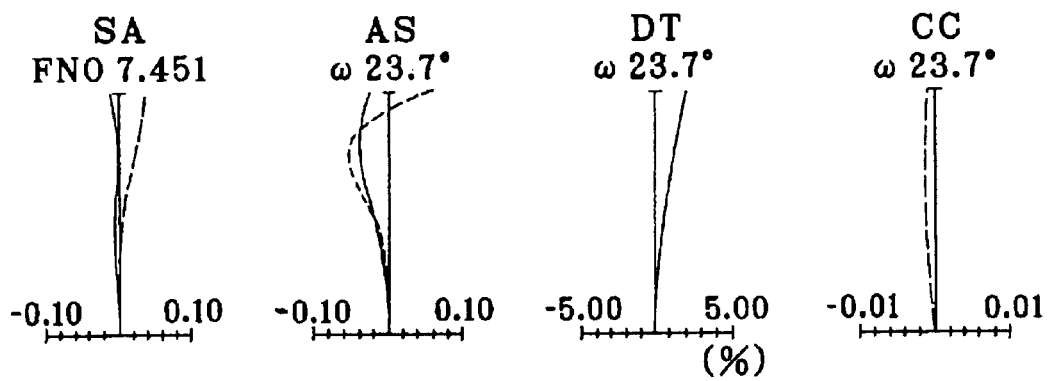
Figure 12C:
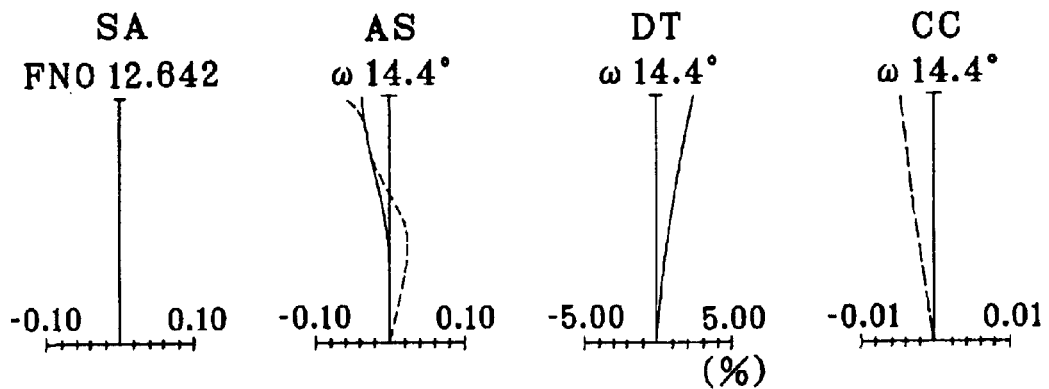
Figure 13:
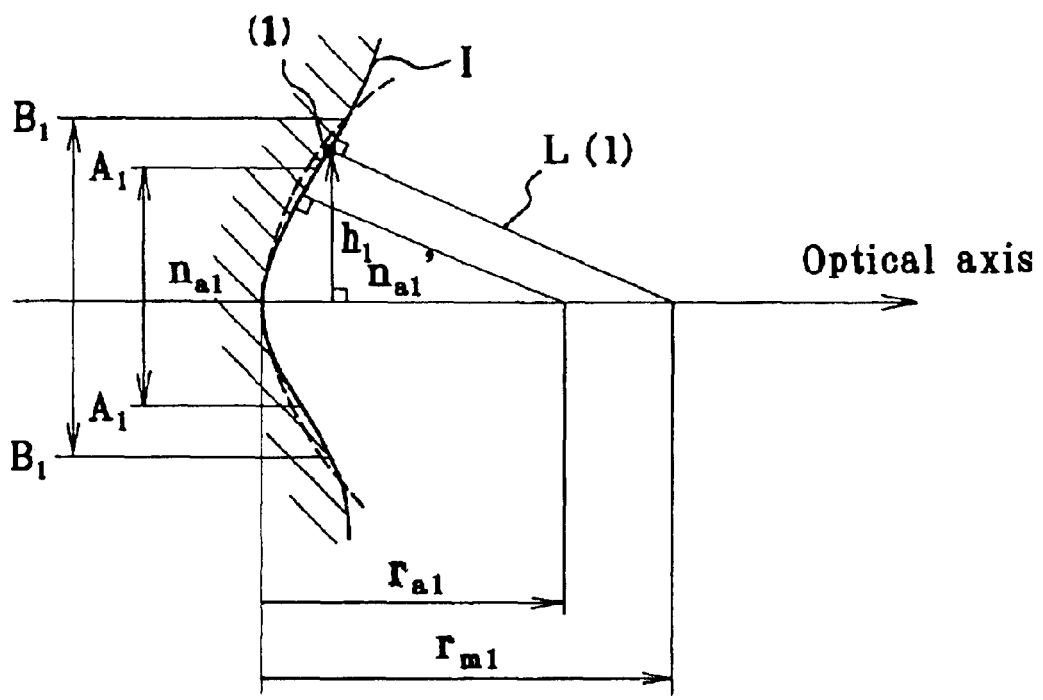
FIG. 13 shows one exemplary shape of aspherical surface I in the first lens group with explanations of the symbols used for condition (1) with respect thereto.

4th surface $K = 0.000$
$A_4 = -2.63379 \times 10^{-3}$
$A_6 = -2.53552 \times 10^{-5}$
$A_8 = -9.03111 \times 10^{-6}$
$A_{10} = -3.56959 \times 10^{-8}$ 8th surface $K = 0.000$
$A_4 = -1.28320 \times 10^{-3}$
$A_6 = -2.03529 \times 10^{-5}$
$A_8 = -6.76960 \times 10^{-7}$
$A_{10} = -1.22132 \times 10^{-8}$ 15th surface $K = 0.000$
$A_4 = -1.23704 \times 10^{-3}$
$A_6 = 1.72577 \times 10^{-4}$
$A_8 = -2.38467 \times 10^{-5}$
$A_{10} = 1.22142 \times 10^{-6}$ FIGS. 12(*a*), 12(*b*) and 12(*c*) are aberration diagrams for Example 1 upon focused at infinity, where (a) shows aberration curves at the wide-angle end, (b) aberration curves at the intermediate settings, and (c) aberration curves at the telephoto end. In these drawings, SA, AS, DT and CC represent spherical aberrations, astigmatism, distortion and chromatic aberrations of magnification, respectively.

Set out below are the values for conditions (1) to (1) in Examples 1 to 11.

| Ex. | Cond. (1) | Cond. (2) | Cond. (3) | Cond. (4) | Cond. (5) | Cond. (6) | Cond. (7) | Cond. (8) | Cond. (9) | Cond. (10) |
|---|---|---|---|---|---|---|---|---|---|---|
| 1 | 0.3 (h = 5) | −0.19 (h = 4) | 0.05 (h = 5) | 1.10 | 1.62 | 4.17 | −0.02 (h = 2.2) | −0.980 | 3.208 | 7.10 |
| 2 | 0.1 (h = 4) | −0.05 (h = 3.7) | *** | 1.67 | 1.26 | 6.35 | −0.03 (h = 2.5) | −0.524 | 4.431 | 6.69 |
| 3 | 0.2 (h = 4) | −0.06 (h = 4) | *** | 1.30 | 1.26 | 4.95 | −0.01 (h = 2.8) | −0.673 | 4.071 | 6.90 |
| 4 | 0.2 (h = 6) | −0.1 (h = 4) | *** | 1.20 | 2.45 | 4.59 | −0.01 (h = 2.5) | −0.784 | 3.642 | 9.24 |
| 5 | 0.4 (h = 5) | *** | 0.07 (h = 5) | 1.18 | 1.81 | 4.48 | −0.01 (h = 2.5) | −0.900 | 3.702 | 10.48 |
| 6 | *** | −0.3 (h = 3) | *** | 1.14 | 1.23 | 4.34 | −0.09 (h = 2.8) | −1.055 | 2.957 | 2.03 |

-continued

| Ex. | Cond. (1) | Cond. (2) | Cond. (3) | Cond. (4) | Cond. (5) | Cond. (6) | Cond. (7) | Cond. (8) | Cond. (9) | Cond. (10) |
|---|---|---|---|---|---|---|---|---|---|---|
| 7  | 0.3 (h = 3)   | ***            | −0.001 (h = 3) | 1.18 | 1.81 | 4.48 | −0.03 (h = 2)   | −0.901 | 3.702 | 10.44 |
| 8  | 0.2 (h = 4.5) | −0.06 (h = 2.3) | ***           | 1.20 | 2.45 | 4.59 | −0.01 (h = 2)   | −0.784 | 3.644 | 9.16 |
| 9  | 0.4 (h = 3)   | −0.08 (h = 1.5) | 0.1 (h = 3)   | 1.10 | 1.62 | 4.17 | −0.02 (h = 1.2) | −0.980 | 3.211 | 7.15 |
| 10 | ***           | −0.2 (h = 1.2)  | ***           | 1.14 | 1.23 | 4.34 | −0.7 (h = 1.2)  | −1.059 | 2.967 | 2.00 |
| 11 | 0.2 (h = 2.5) | −0.02 (h = 1.6) | ***           | 1.30 | 1.26 | 4.95 | −0.04 (h = 1)   | −0.673 | 4.065 | 6.93 |

The bracketed h added after the values of conditions (1), (2), (3) and (7) represents the heights of the figured out points from the optical axis, and *** shows that the condition is not used in the example.

The aforesaid zoom lens systems according to the present invention may be used with various phototaking systems using electronic image pickup devices such as CCDs, and CMOS sensors, as embodied below.

The zoom lens system according to the present invention may be used on various image pickup systems using electronic image pickup devices such as CCD or CMOS sensors, as embodied below.

Figure 14:
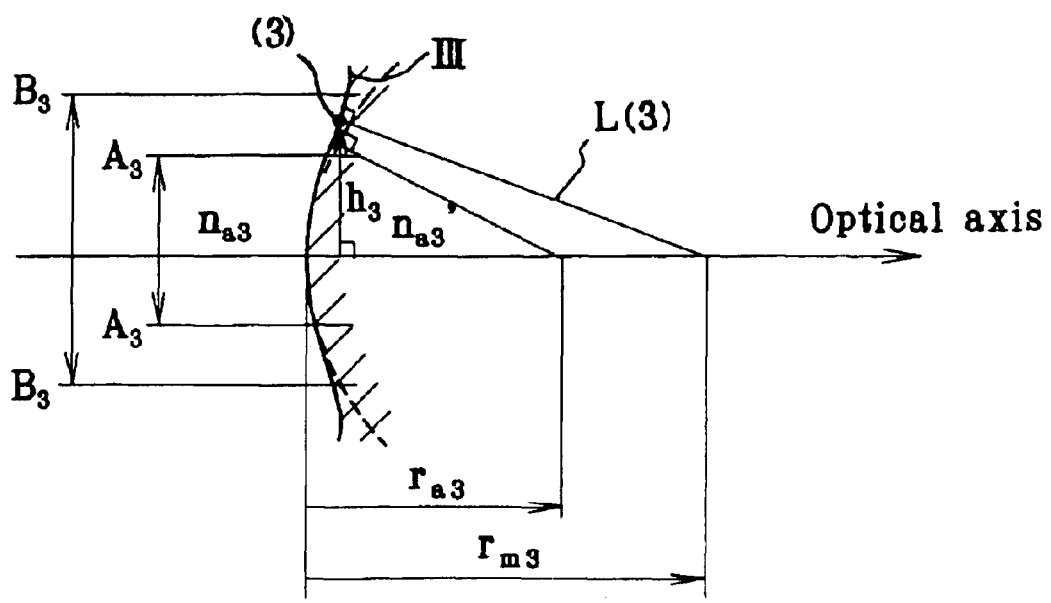
FIG. 14 shows one exemplary shape of aspherical surface III in the thrid lens group with explanations of the symbols used for condition (2) with respect thereto.
Figure 15:
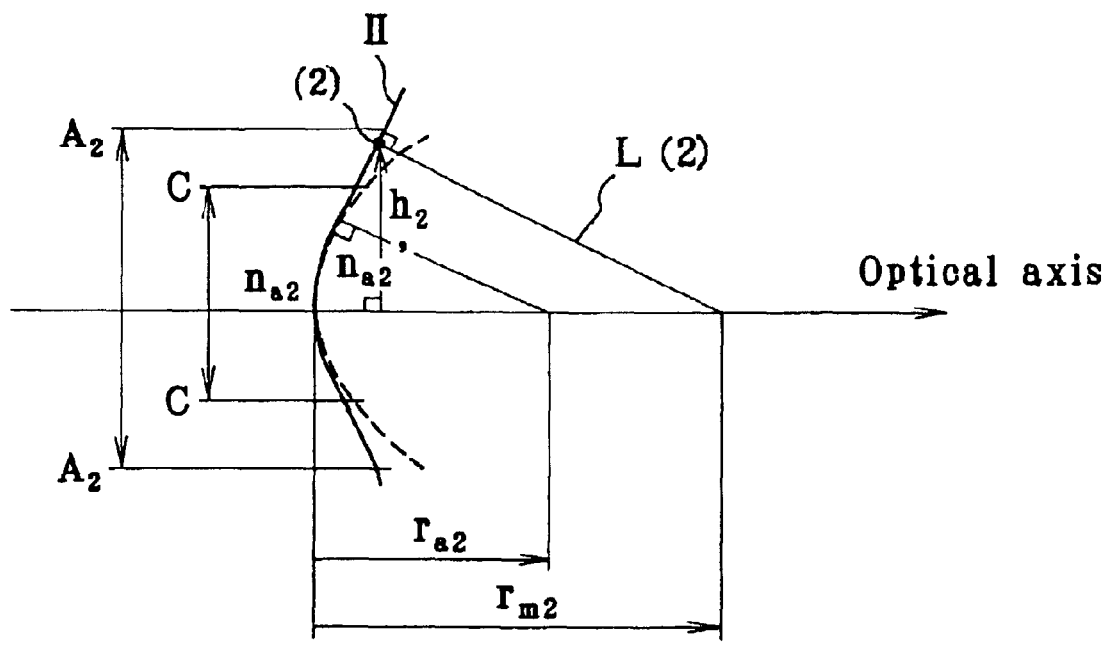
FIG. 15 shows one exemplary shape of aspherical surface II in the second lens group with explanations of the symbols used for condition (7) with respect thereto.
Figure 16:
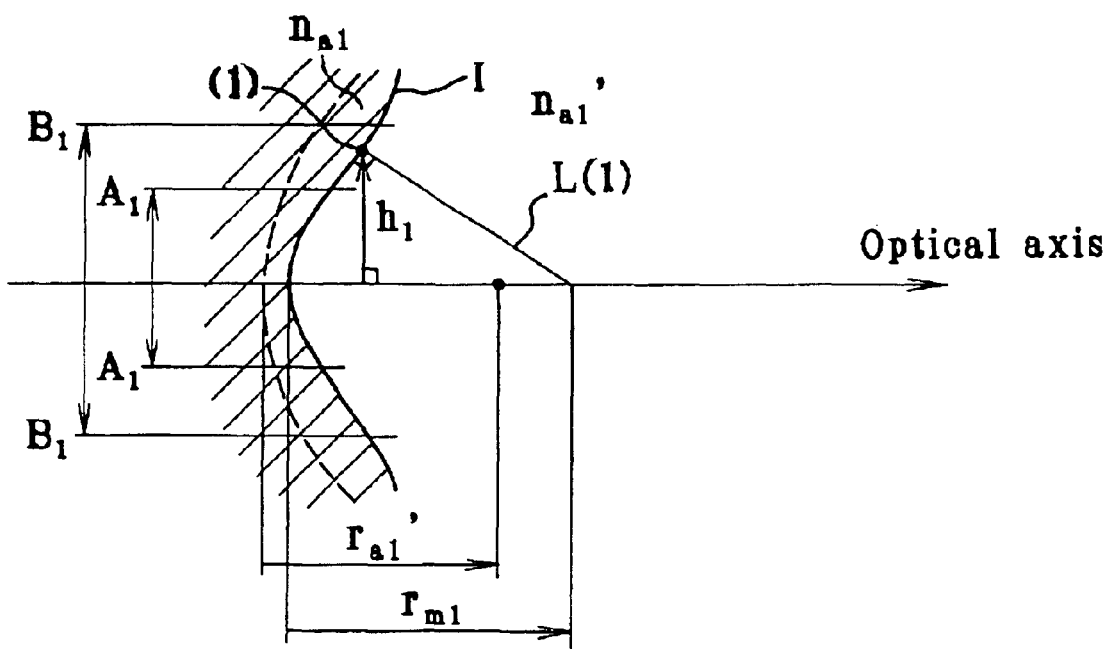
FIG. 16 shows one exemplary construction of aspherical surface I obtained by coating a resin on the concave surface in the first lens group with explanations of symbols used for condition (3) with respect thereto.
Figure 17:
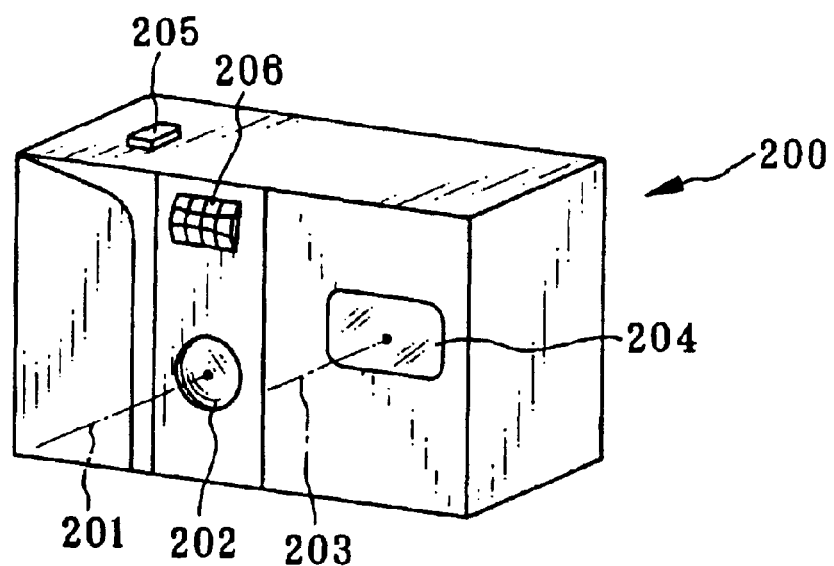
FIG. 17 is a front perspective view of an electronic camera wherein the zoom lens system of the present invention is incorporated in the form of an objective optical system.
Figure 18:
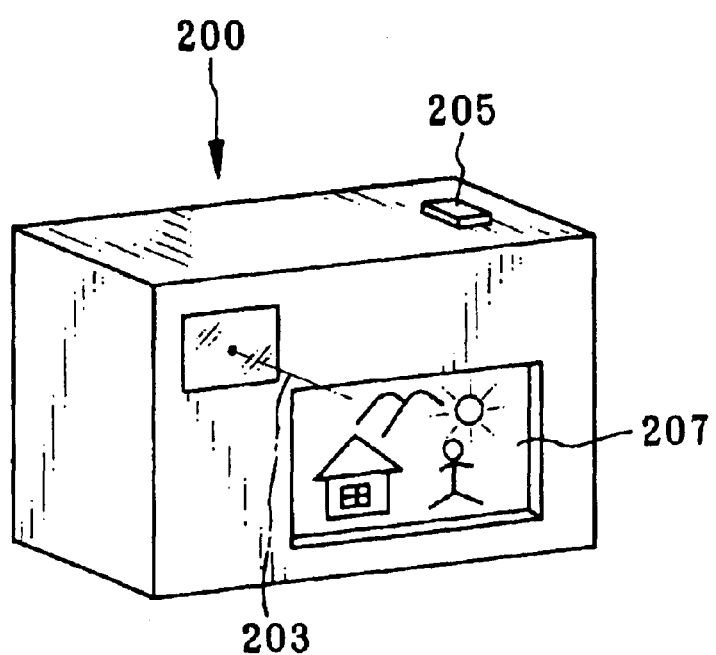
FIG. 18 is a rear perspective view of the electronic camera wherein the zoom lens system of the present invention is incorporated in the form of an objective optical system.
Figure 19:
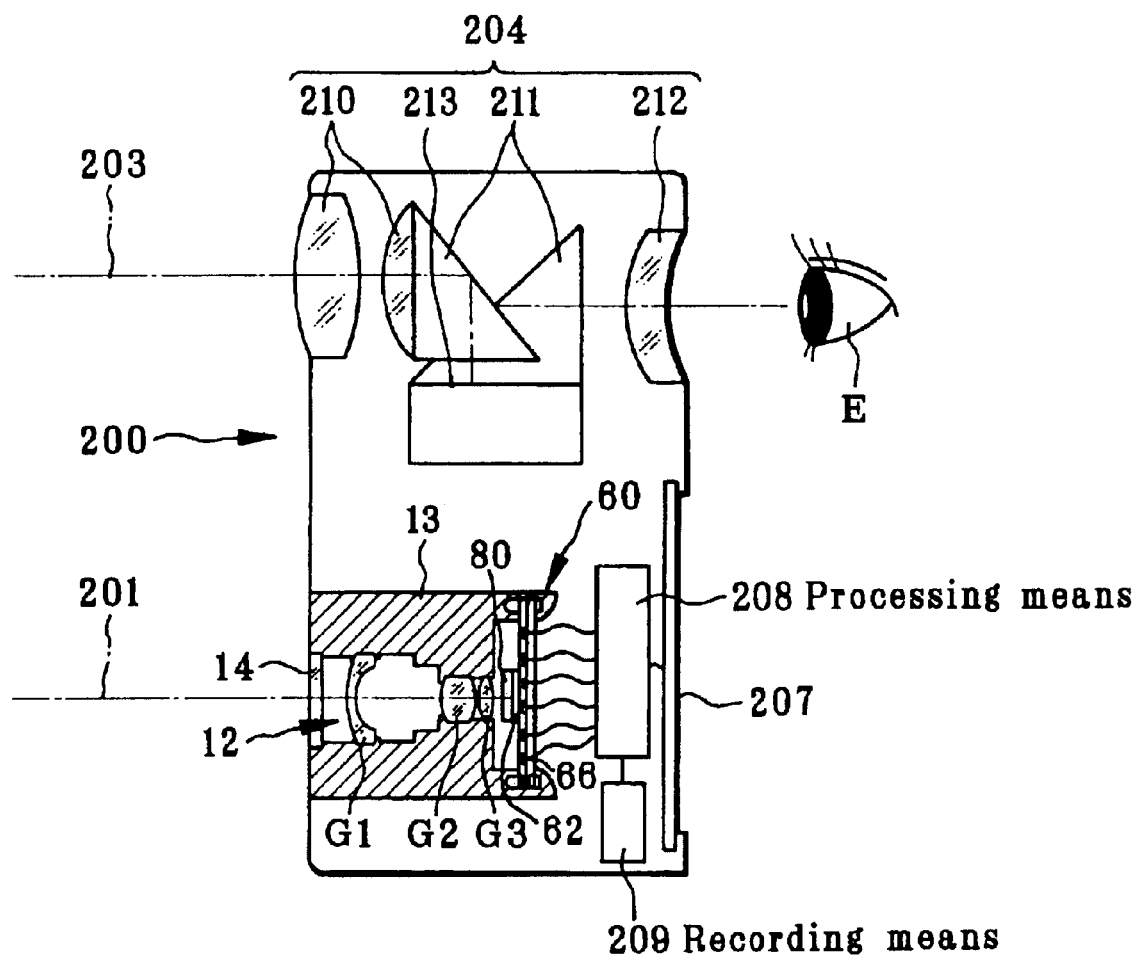
FIG. 19 is a sectional view of one exemplary construction of the electronic camera wherein the zoom lens system of the present invention is incorporated in the form of an objective optical system.

An electronic cameral wherein the zoom lens system of the present invention is incorporated in the form of an objective optical system is shown in FIGS. 14 to 16. FIG. 14 is a front perspective view illustrative of the appearance of an electronic camera 200, and FIG. 15 is a rear perspective view illustrative of the electronic camera 200. FIG. 16 is a sectional view illustrative of the construction of the electronic camera 200. As shown in FIGS. 14 to 16, the electronic camera 200 comprises a phototaking optical system 202 including a phototaking optical path 201, a finder optical system 204 including a finder optical path 203, a shutter 205, a flash 206 and a liquid crystal display monitor 207. Upon pressing down the shutter button 205 located on the upper portion of the camera 200, phototaking occurs through an objective lens system 12 comprising the instant zoom lens system (roughly shown) located as a phototaking objective optical system. An object image formed through the phototaking optical system is then formed on the image pickup plane of an image pickup device chip 62 such as a CCD via an IR (infrared ray) cut filter 80.

The IR cut filter 80 is additionally added onto the image pickup device chip 62 to form an integral image pickup unit 60, which can be mounted on the rear end of a lens barrel 13 of the objective 12 in one-touch simple operation. Thus, any centering operation of the objective 12 with respect to the image pickup device chip 62 and any surface-spacing regulation operation can be dispensed with, resulting in commercial merits such high camera fabrication capability and cost reductions. The front end of the lens barrel 13 is provided with a cover glass 14 for the protection of the objective 12. It is here noted that the zoom lens driving mechanism in the lens barrel 13 is not shown.

The object image sensed by image pickup device chip 62 is displayed as an electronic image on the liquid crystal display monitor 207 located on the back side of the camera via processing means 208 electrically connected to a terminal 66. This processing means 208 may also control recording means 209 for recording the object image phototaken through the image pickup device chip 62 in the form of electronic information. It is here noted that the recording means 209 may be provided as a memory mounted on the processing means 208 or in the form of a device electrically connected to the processing means 208 to electronically write the information into a magnetic recording medium such as a floppy disk or smart media.

Further, the finder optical system 204 having a finder optical path 203 comprises a finder objective optical system 210, a Porro prism 211 for erecting the object image formed through the finder objective optical system 210 and an eyepiece 212 for guiding the object image to the eyeball E of an observer. The Porro prism 211 is divided into a front and a rear block with an object image-forming surface located between them. On this surface there is provided a field frame-of-view frame 213. The Porro prism 211 comprises four reflecting surfaces to erect the object image formed through the finder objective optical system 210.

To reduce the number of parts and achieve compactness and cost reductions, the finder optical system 204 may be removed from the camera 200. In this case, the observer carries out phototaking while looking at the liquid crystal monitor 207.

Figure 20:
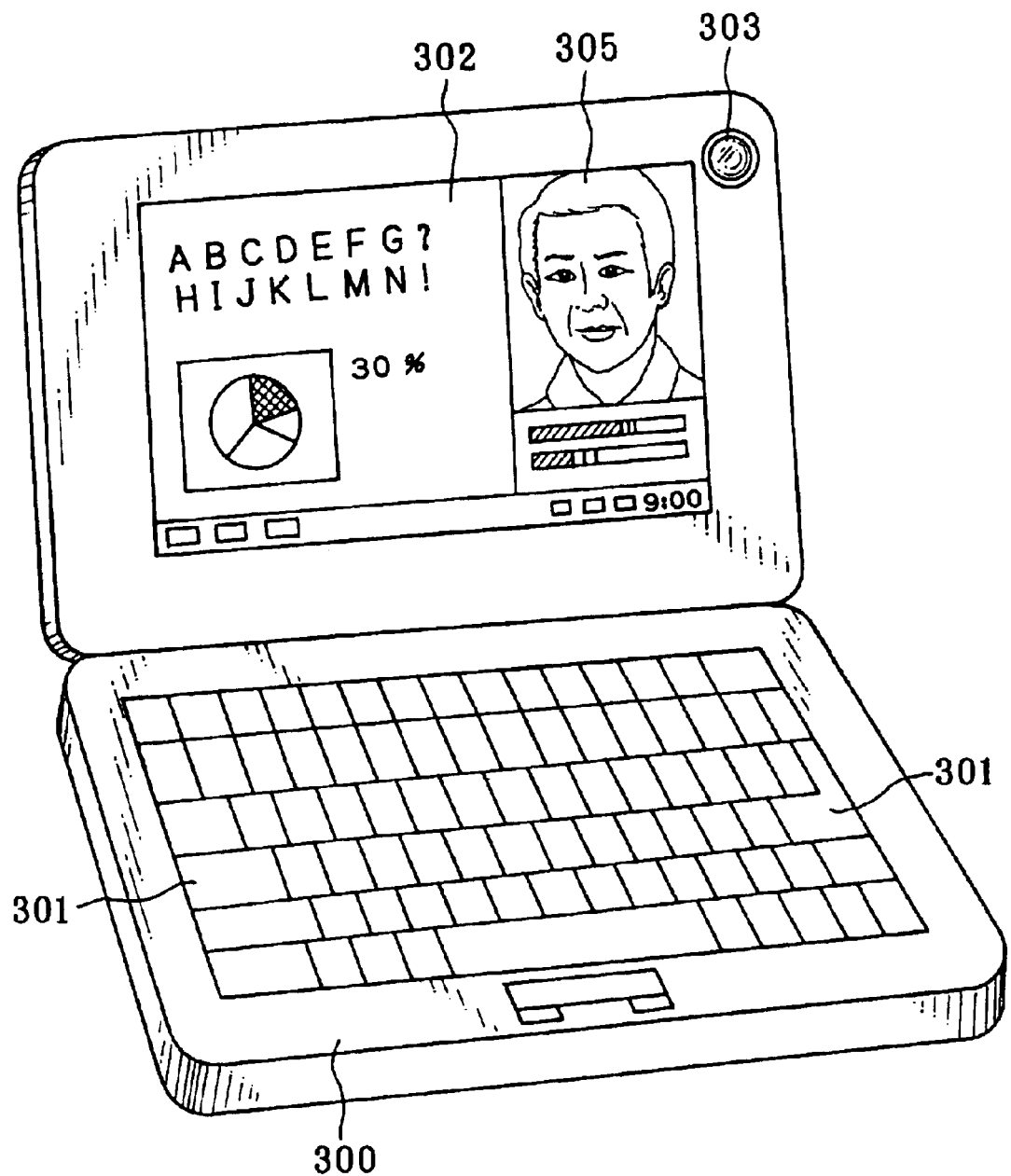
FIG. 20 is a front perspective view of an uncovered personal computer wherein the zoom lens system of the present invention is incorporated in the form of an objective optical system.
Figure 21:
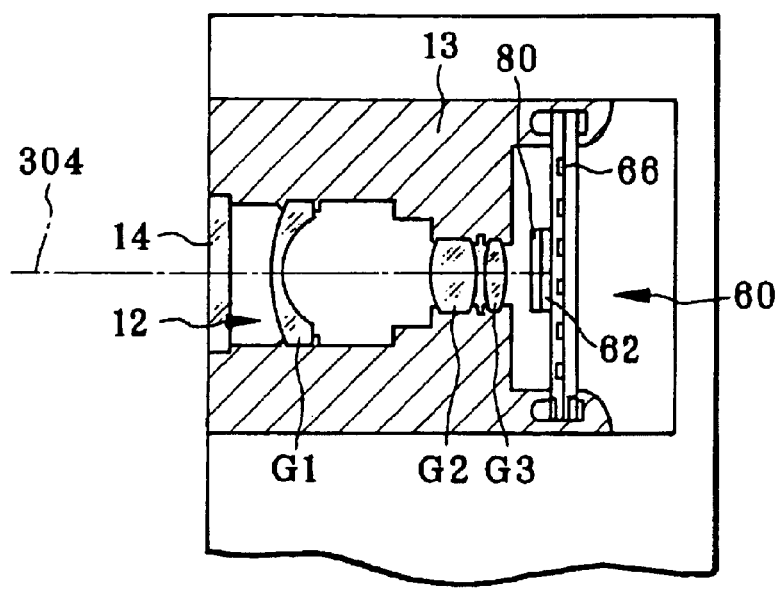
FIG. 21 is a sectional view of a phototaking optical system in the personal computer.
Figure 22:
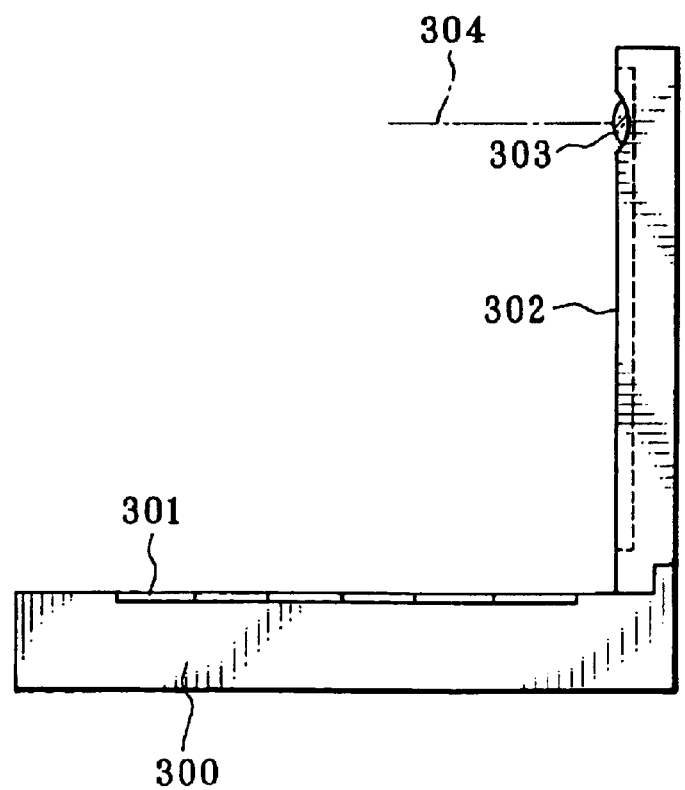
FIG. 22 is a side view of FIG. 20.

Shown in FIGS. 20 to 22 is a personal computer that is one example of the information processor in which the zoom lens system of the invention is incorporated in the form of an objective optical system. FIG. 20 is a front perspective views of an uncovered personal computer 300, FIG. 21 is a sectional view of a phototaking optical system 303 mounted on the personal computer 300, and FIG. 22 is a side view of FIG. 20. As depicted in FIGS. 20 to 22, the personal computer 300 comprises a key board 301 for allowing an operator to enter information therein from outside, information processing and recording means (not shown), a monitor 302 for displaying the information to the operator and a phototaking optical system 303 for phototaking an image of the operator per se and images of operator's surroundings. The monitor 302 used herein may be a transmission type liquid crystal display device designed to be illuminated by a backlight (not shown) from the back side, a reflection type liquid crystal display device designed to display images by reflecting light from the front side, a CRT display or the like. As shown, the phototaking optical system 303 is built in the right upper portion of monitor 302. However, it is to be understood that the phototaking optical system 303 may be positioned somewhere on the periphery of monitor 302 or keyboard 301.

The phototaking optical system 303 includes on a phototaking optical path 304 an objective lens system 112 comprising the zoom lens system 12 of the invention (roughly shown) and an image pickup device chip 62 for receiving an image. These are built in the personal computer 300.

An IR cut filter 80 is additionally added onto the image pickup device chip 62 to form an integral image pickup unit 60, which can be mounted on the rear end of a lens barrel 13 of the objective 12 in one-touch simple operation. Thus, any centering operation of the objective 12 with respect to the image pickup device chip 62 and any surface-spacing regulation operation can be dispensed with, resulting in commercial merits such high camera fabrication capability and cost reductions. The front end of the lens barrel 13 is provided with a cover glass 14 for the protection of the objective 12. It is here noted that the zoom lens driving mechanism in the lens barrel 13 is not shown.

An object image sensed by the image pickup device chip 62 is entered from a terminal 66 in the processing means in the personal computer 300, and displayed as an electronic image on the monitor 302. Shown in FIG. 20 as an example is a phototaken image 305 of the operator. It is possible to display the image 305, etc. on a personal computer at the other end on a remote place via an internet or telephone line.

Figure 23A:
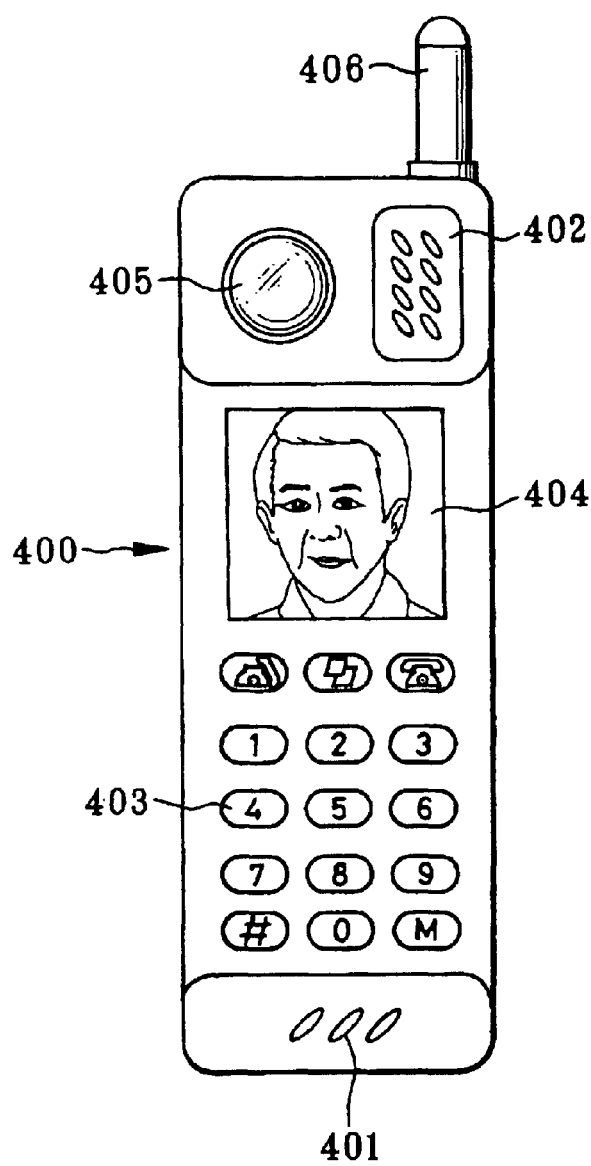
FIGS. 23(*a*) and 23(*b*) are a front and a side view of a portable telephone wherein the zoom lens system of the present invention is incorporated in the form of an objective optical system, and FIG. 23(*c*) is a sectional view of a phototaking optical system therefor.
Figure 23B:
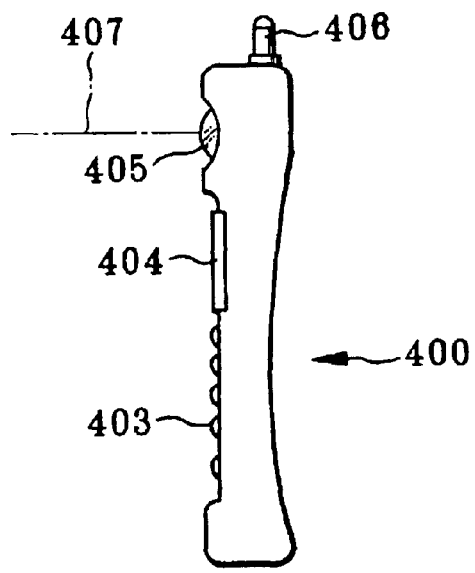
Figure 23C:
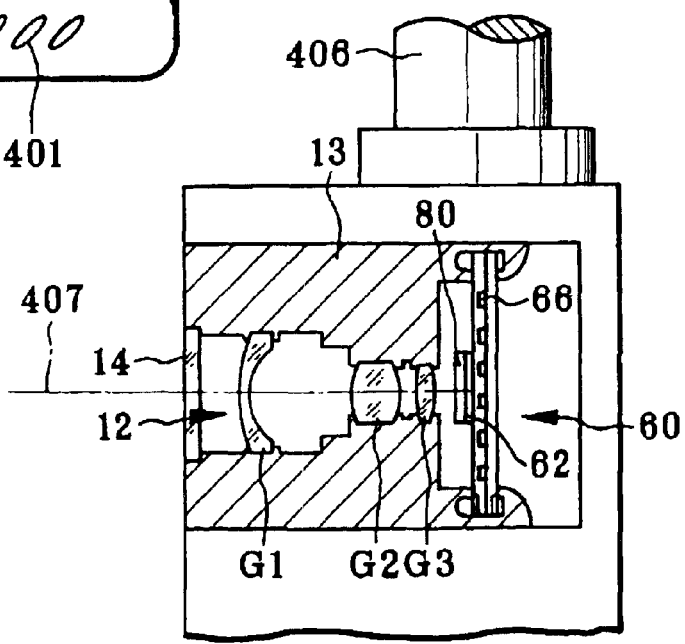

Illustrated in FIG. 23 is a telephone handset that is one example of the information processor in which the zoom lens system of the invention is built in the form of a phototaking optical system, especially a convenient-to-carry portable telephone handset. FIG. 23(a) is a front view of a portable telephone handset 400, FIG. 23(b) is a side view of handset 400 and FIG. 23(c) is a sectional view of a phototaking optical system 405. As depicted in FIGS. 23(a) to 23(c), the telephone handset 400 comprises a microphone portion 401 for entering an operator's voice therein as information, a speaker portion 402 for producing a voice of a person on the other end, an input dial 403 allowing the operator to enter information therein, a monitor 404 for displaying phototaken images of the operator and the person on the other end and information such as telephone numbers, a phototaking optical system 405, an antenna 406 for transmitting and receiving communication waves and a processing means (not shown) for processing image information, communication information, input signals, etc. The monitor 404 used herein is a liquid crystal display device. The arrangement of these parts is not necessarily limited to that illustrated. The phototaking optical system 405 includes on a phototaking optical path 407 an objective lens system 12 comprising the zoom lens system (roughly illustrated) of the invention and an image pickup device chip 62 for receiving an object image. These are built in the telephone handset 400.

An IR cut filter 80 is additionally added onto the image pickup device chip 62 to form an integral image pickup unit 60, which can be mounted on the rear end of a lens barrel 13 of the objective 12 in one-touch simple operation. Thus, any centering operation of the objective 12 with respect to the image pickup device chip 62 and any surface-spacing regulation operation can be dispensed with, resulting in commercial merits such high camera fabrication capability and cost reductions. The front end of the lens barrel 13 is provided with a cover glass 14 for the protection of the objective 12. It is here noted that the zoom lens driving mechanism in the lens barrel 13 is not shown.

The object image sensed by the image pickup device chip 62 is entered from a terminal 66 in a processing means (not shown), and displayed as an electronic image on the monitor 404 and/or a monitor on the other end. To transmit an image to a person on the other end, the processing means includes a signal processing function of converting information about the object image received at the image pickup element chip 162 to transmittable signals.

As can be understood from the foregoing, the present invention makes it possible to provide a zoom lens system having a zoom ratio of about 3, a wide field angle on its wide-angle side and a small F-number as well as a lens layout enabling satisfactory image-formation capability to be obtained. This zoom lens system is excellent in fabrication capability, and is particularly suitable for use on compact portable information terminals.

I claim:

1. A zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said first lens group comprises, in order from an object side thereof, a negative lens component, a negative lens component and a positive lens component, said third lens group consists of one lens element, said first lens group further comprises a lens element having an aspherical surface that satisfies the following condition (1), and said third lens group further comprises a lens element having an aspherical surface that satisfies the following condition (2):

$$0<(1/r_{a1}-1/r_{m1})h_1/(n_{a1}-n_{a1}')<1 \quad (1)$$

$$-1<(1/r_{a3}-1/r_{m3})h_3/(n_{a3}-n_{a3}')<0 \quad (2)$$

where $r_{a1}$ is a paraxial radius of curvature of an aspherical surface I located in said first lens group, $r_{m1}$ is a distance from a point of intersection of an optical axis with said aspherical surface I located in said first lens group to a point on the optical axis where a normal to an arbitrary point (1) between the maximum diameter of an axial light beam on said aspherical surface I and an effective diameter including an off-axis light beam on said aspherical surface I is closest to the optical axis, $n_{a1}$ is a refractive index of said aspherical surface I on an object side thereof, $n_{a1}'$ is a refractive index of said aspherical surface I on an image side thereof, $h_1$ is a height of said point (1) from the optical axis, $r_{a3}$ is a paraxial radius of curvature of an aspherical surface III located in said third lens group, $r_{m3}$ is a distance from a point of intersection of the optical axis with said aspherical surface III located in said third lens group to a point on the optical axis where a normal to an arbitrary point (3) between the maximum diameter of an axial light beam on said aspherical surface III and an effective diameter including an off-axis light beam on said aspherical surface III is closest to the optical axis, $n_{a3}$ is a refractive index of said aspherical surface III on an object side thereof, $n_{a3}'$ is a refractive index of said aspherical surface III on an image side thereof, and $h_3$ is a height of said point (3) from the optical axis.

2. A zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said third lens group consists of one lens element, and said first lens group comprises a lens element obtained by coating a thin resin on a concave surface of a spherical lens element satisfying the following condition (3), thereby forming an spherical surface thereon:

$$-0.1<(1/r_{a1}'-1/r_{m1})h_1/(n_{a1}-n_{a1}')<1 \quad (3)$$

where $r_{a1}'$ is a paraxial radius of curvature of the concave surface coated thereon with the resin to form an aspherical surface I located in said first lens group, $r_{m1}$ is a distance from a point of intersection of an optical axis with said aspherical surface I located in said first lens group to a point on the optical axis where a normal to an arbitrary point (1) between the maximum diameter of an axial light beam on said aspherical surface I and an effective diameter including an off-axis light beam on said aspherical surface I is closest to the optical axis, $n_{a1}$ is a refractive index of said aspherical surface I on an object side thereof, $n_{a1}'$ is a refractive index of said aspherical surface I on an image side thereof, and $h_1$ is a height of said point (1) from the optical axis.

3. A zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said first lens group consists of, in order from an object side thereof, a negative lens component, air, a negative lens component, air and a positive lens component, said third lens group consists of one lens element, an aspherical surface that satisfies the following condition (7) is used at the surface located nearest to object side in said second lens group, and the following condition (4) is satisfied:

$$-1<(1/r_{a2}-1/r_{m2})h_2/(1-n_{a2}')<0 \quad (7)$$

$$0.4<f_3/f_t<2.5 \quad (4)$$

where $r_{a2}$ is a paraxial radius of curvature of an aspherical surface II located in said second lens group, $r_{m2}$ is a distance from a point of intersection of an optical axis with said aspherical surface II located in said second lens group to a point on the optical axis where a normal to an arbitrary point (2) between a diameter that is 7/10 of the maximum diameter of an axial light beam on said aspherical surface II and the maximum diameter of the axial beam on said aspherical surface II is closest to the optical axis, $n_{a2}'$ is a refractive index of the lens element located nearest to the object side in said second lens group, $h_2$ is a height of said point (2) from the optical axis, $f_3$ is a focal length of said third lens group, and $f_t$ is a focal length of said zoom lens system at a telephoto end thereof.

4. A zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said first lens group consists of, in order from an object side thereof, a negative lens component, air, a negative lens component, air and a positive lens component, said third lens group consists of one lens element, an aspherical surface that satisfies the following condition (7) is used at the surface located nearest to object side in said second lens group, and the following condition (5) is satisfied:

$$-1<(1/r_{a2}-1/r_{m2})h_2/(1-n_{a2}')<0 \quad (7)$$

$$1.2<f_{1-N}/f_{2-N}<2.7 \quad (5)$$

where $r_{a2}$ is a paraxial radius of curvature of an aspherical surface II located in said second lens group, $r_{m2}$ is a distance from a point of intersection of an optical axis with said aspherical surface II located in said second lens group to a point on the optical axis where a normal to an arbitrary point (2) between a diameter that is 7/10 of the maximum diameter of an axial light beam on said aspherical surface II and the maximum diameter of the axial light beam on said aspherical surface II is closest to the optical axis, $n_{a2}'$ is a refractive index of the lens element located nearest to the object side in said second lens group, $h_2$ is a height of said point (2) from the optical axis, $f_{1-N}$ is a focal length of the negative lens component located nearest to the object side in said first lens group, and $f_{2-N}$ is a focal length of the second negative lens component in said first lens group, as counted from the object side.

5. A zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said first lens group consists of, in order from an object side thereof, a negative lens component, air, a negative lens component, air and a positive lens component, said third lens group consists of one lens element, an aspherical surface that satisfies the following condition (7) is used at the surface located nearest to object side in said second lens group, and the following condition (6) is satisfied:

$$-1<(1/r_{a2}-1/r_{m2})h_2/(1-n_{a2}')<0 \quad (7)$$

$$2<f_3/IH<12 \quad (6)$$

where $r_{a2}$ is a paraxial radius of curvature of an aspherical surface II located in said second lens group, $r_{m2}$ is a distance from a point of intersection of an optical axis with said aspherical surface II located in said second lens group to a point on the optical axis where a normal to an arbitrary point (2) between a diameter that is 7/10 of the maximum diameter of an axial light beam on said aspherical surface II and the maximum diameter of the axial light beam on said aspherical surface II is closest to the optical axis, $n_{a2}'$ is a refractive index of the lens element located nearest to the object side in said second lens group, $h_2$ is a height of said point (2) from the optical axis, $f_3$ is a focal length of said third lens group, and IH represents an image height.

6. A zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, lenses forming said first lens group are all defined by meniscus lens components, each convex on an object side thereof, and the following condition (5) is satisfied:

$$1.2 < f_{1-N}/f_{2-N} < 2.7 \qquad (5)$$

where $f_{1-N}$ is a focal length of the negative lens component located nearest to the object side in said first lens group, and $f_{2-N}$ is a focal length of the second negative lens component in said first lens group, as counted from the object side.

7. A zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, lenses forming said first lens group are all defined by meniscus lens components, each convex on an object side thereof, and the following condition (8) is satisfied:

$$-1.35 < f_1/f_3 < -0.4 \qquad (8)$$

where $f_1$ is a focal length of said first lens group, and $f_3$ is a focal length of said third lens group.

8. A zoom lens system comprising, in order from an object side of said zoom lens system, a first lens group having negative power, an aperture stop, a second lens group having positive power and a third lens group having positive power, wherein:

for zooming, said first lens group and said second lens group move on an optical axis with a varying spacing between adjacent lens groups while said third lens group remains fixed, during said zooming, said stop moves in unison with said second lens group, said first lens group consists of, in order from an object side thereof, a negative lens component, a negative lens component and a positive lens component, and said third lens group consists of one lens element having on the object side an aspherical surface that satisfies the following condition (2):

$$-1 < (1/r_{a3} - 1/r_{m3})h_3/(n_{a3} - n_{a3}') < 0 \qquad (2)$$

where $r_{a3}$ is a paraxial radius of curvature of an aspherical surface III located in said third lens group, $r_{m3}$ is a distance from a point of intersection of the optical axis with said aspherical surface III located in said third lens group to a point on the optical axis where a normal to an arbitrary point (3) between the maximum diameter of an axial light beam on said aspherical surface III and an effective diameter including an off-axis light beam on said aspherical surface III is closest to the optical axis, $n_{a3}$ is a refractive index of said aspherical surface III on an object side thereof, $n_{a3}'$ is a refractive index of said aspherical surface III on an image side thereof, and $h_3$ is a height of said point (3) from the optical axis.

9. An image pickup system using a zoom lens system as recited in claims, 1, 2, 3, 7, to 8 as an objective optical system, wherein an electronic image pickup device is located on an image side of said zoom lens system.

* * * * *